United States Patent
Drake, Jr. et al.

(10) Patent No.: US 7,110,956 B1
(45) Date of Patent: Sep. 19, 2006

(54) CAPABILITY PREDICTOR

(75) Inventors: Paul J. Drake, Jr., Richardson, TX (US); Richard W. Johnson, Dallas, TX (US); Michael J. Kelly, Mesquite, TX (US); Michael D. King, Plano, TX (US); Clifford M. Polo, Argyle, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1008 days.

(21) Appl. No.: 08/654,445

(22) Filed: May 28, 1996

(51) Int. Cl.
*G06F 17/50* (2006.01)
(52) U.S. Cl. .......................................... 705/7; 705/35
(58) Field of Classification Search ............. 364/468, 364/513, 489, 500; 395/22; 705/7, 35–40
See application file for complete search history.

(56) References Cited

U.S. PATENT DOCUMENTS

| | | | | |
|---|---|---|---|---|
| 4,754,410 A | * | 6/1988 | Leech et al. | 364/513 |
| 4,907,167 A | * | 3/1990 | Skerik | 364/500 |
| 5,153,825 A | * | 10/1992 | Yauk et al. | 364/401 |
| 5,249,120 A | | 9/1993 | Foley | 705/1 |
| 5,452,218 A | | 9/1995 | Tucker et al. | 364/468 |
| 5,552,995 A | * | 9/1996 | Sebastian | 364/468 |
| 5,555,201 A | * | 9/1996 | Dangelo et al. | 364/489 |
| 5,649,064 A | * | 7/1997 | Jorgensen et al. | 395/22 |
| 5,835,087 A | * | 11/1998 | Herz et al. | 345/327 |
| 5,862,260 A | * | 1/1999 | Rhoads | 382/232 |

FOREIGN PATENT DOCUMENTS

| | | |
|---|---|---|
| EP | 0 466 098 A2 | 1/1992 |
| EP | 0468 728 A2 * | 1/1992 |
| EP | 0 660 210 A2 * | 6/1995 |

OTHER PUBLICATIONS

APICS Dictionary, 9th. Ed., J.F. Cox III and J. H. Blackstone, published by APICS-The Educational Society for Resource Management, 1998, p. 54.*
Bloch et al., "Process-Based Cost Modeling", 8091 IEEE Transactions on Components, Hybrids, and Manufacturing Technology Jun. 15, 1992, No. 3, New York, USA.*
Carl Bloch and Ranga Ranganathan, "Process-Based Cost Modeling," IEEE Transactions on Components, Hybrids, and Manufacturing Technology, Jun. 15, 1992, No. 3, pp. 288-294.

* cited by examiner

*Primary Examiner*—Frantzy Poinvil
(74) *Attorney, Agent, or Firm*—W. James Brady, III; Frederick J. Telecky, Jr.

(57) ABSTRACT

A capability predictor that comprises a database 15 of capability of multiple designs is disclosed. The process capability data includes costs, quality, cycle time, and performance models. The process owner (expert) provides the data. The developer inputs equations necessary to calculate the predictions based in the selected design characteristics and the user selects the design. A processor 11 calculates the prediction based on the selected design and a display, such as monitor 11*a* or printer 16, displays the results of the predictions.

24 Claims, 23 Drawing Sheets

FIG. 3

Microsoft Excel - STRIPE.XLS

File  Edit  View  Insert  Format  Tools  Data  Window  Views  Help

Single Conductor Wire Striping

How many times will this process be applied? 40                                      Rev: N/C

| Jacket Material | Rating | Wire Gauge | Rating | Number of Stripes | Rating | Conductor Plating | Rating |
|---|---|---|---|---|---|---|---|
| ○ Crosslinked Tefze | 1.0 | ○ 20 awg | 1.0 | ○ One Stripe | 1.0 | ● Silver | 1.0 |
| ○ Kynar (vf-2) | 1.0 | ○ 22 or 24 awg | 0.9 | ○ Two Stripes | 0.9 | ○ Tin Lead | 0.8 |
| ● Teflon (ptfe) | 0.5 | ● 18 awg | 0.7 | ● Three Stripes | 0.8 | ○ Other | 0.0 |
| ○ Teflon (fep) | 0.2 | ○ 16 awg | 0.4 | ○ 4 or 5 Stripes | 0.0 | | |
| ○ Tefzel or PVC | 0.1 | ○ 14 or 26 awg | 0.2 | | | | |
| | | ○ 10, 12, or 28 awg | 0.1 | | | | |
| | | ○ 30 awg | 0.0 | | | | |
| WT 0.6 | Score 0.3 | WT 0.2 | Score 0.14 | WT 0.15 | Score 0.12 | WT 0.05 | Score 0.05 |

Cable/Wire Harness Length (approx.):

Length (in.): 12     Wire Gauge (specific): 18
                     14
                     16
                     18
                     20
                     22
                     24
                     26

Input approximate length, +/- 6 in.    This selection should match the wire gauge selected above.

Total Score: 0.61 dpmo    230  4734  9238  13742  18246  22750     DPU 0.3606
                      9.015

Cost ($)   $0   $5   $10   $15                   %NVA 35%
                      $11.71

Time (Hrs)  4.21  4.22  4.23  4.24  4.25          %NVA 100%

Design Feature Score
0.6
0.4
0.2
0
    Jacket        Wire      Number      Conductor
   Material      Gauge     of Stripes    Plating □ WT  ■ Score

[Accept]  [Cancel]  [Help]

Stripe

| | A | B | C | D | E | F | G | H | I | J | K | L | M | N | O | P |
|---|---|---|---|---|---|---|---|---|---|---|---|---|---|---|---|---|
| 1 | INTERCONNECT TECHNOLOGY | | Rev. n/c | | | | | | | | | PROCESS WORKSHEET | | | | |
| 2 | Analysis by: M.J. Kelly | | | | | | | | | | | Assembly Name: Some Wire Harness | | | | |
| 3 | Date: March 28, 1995 | | | | | | | | | | | Part No.: 1234567-1, Rev: A | | | | |
| 4 | File name: C:\PCAT\DATA\SCRNPRT.XLS | | | | | | | | | | | NHA: 1234568-1 | | | | |
| 5 | Cost | $10.65 | 22% | N/A | | | | | | | | Trade Study | | | | |
| 6 | CT (hrs) | 4.2 | 8% | N/A | | | | | | | | | | | | |
| 7 | DPU | 0.01 | FTY | 99% | | | | | | | | | | | SUMMARY | |
| 8 | Sigma | 4.05 | Worksheet Totals: | | | | 1 | 0 | 5,400 | | | | | $10.65 | 4.2 | 0.01 |
| 9 | Oper # | Process | | Proc descripter | Proc code | Qty | Proc oppor | Total oppor | Non Std | dpmo | Std Dev | A/E | Data source | COST | CYCLE TIME (hrs) | DPU |
| 10 | Model | Wire Stripe, Single Conductor | | | | | | | | | | | | | | |
| 11 | Model | Wire Stripe, Multi-Conductor | | | | | | | | | | | | | | |
| 12 | Model | Wire Twist | | | | | | | | | | | | | | |
| 13 | Model | Lay Table | | | | | | | | | | | | | | |
| 14 | Model | Route Wire/Cable | | | | 1 | | | | | | | | | | |
| 15 | Model | Contact Termination | | | | | 0 | | | | | | | | | |
| 16 | Model | Inline Termination | | | | | | | | | | | | | | |
| 17 | Model | Contact Pin Insertion | | | | | | | | | | | | | | |
| 18 | Model | Special bulkhead bracket bonding | | | | 1 | 1 | 1 | 5,400 | | | E | USER | Rubber bond process | $10.65 | 4.2 | 0.01 |
| 19 | Model | Strain Relief | | | | | | | | | | | | | | |
| 20 | Model | Marking | | | | | | | | | | | | | | |
| 23 | END OF FILE! | Use the "INSERT" button if additional | | | | | | | | | | | | | | |
| 24 | INSERT | lines are needed. | | | | | | | | | | | | | | |

FIG. 8

Microsoft Excel-ITO_WS1.XLS
File  Edit  View  Insert  Format  Tools  Data  Window  Views  Help

F10            1995

PROGRAM COVER SHEET FOR INDICATED ASSEMBLY           Rev. n/c

PROGRAM NAME:        X                          ASSEMBLY NAME:    Some Wire Harness
PROGRAM MGR:         R. Johnson                 PART NO.:         1234567-1
ANALYSIS BY:         M.J. Kelly                 REV:              A
ANALYSIS DATE:       March 28, 1995             NHA:              1234568-1
FILE NAME:           C:\PCAT\DATA\ITO_WS1.XLS

FOR THIS ANALYSIS, THE FOLLOWING ASSUMPTIONS APPLY:

CONSTANT YEAR DOLLARS:              1995
LABOR RATE:                        10.00    (dollars/hour)
OVERHEAD RATE (MANUF.):             150%
IMPROVEMENT/LEARNING CURVE:         85%     Used to determine unit cost at TLMP.
NUMBER UNITS PER SYSTEM:              1     Quantity of this unique unit used in the system.
QUANTITY OF PRIOR UNITS BUILT:        0     Enter value if no significant break in production.
AVERAGE LOT SIZE:                     1     Number of units processed per set-up.
CONTRACT SCHEDULE START YEAR:      1995     (yyyy)

| YEAR        | PRIOR | 1995 | 1996 | 1997 | 1998 | 1999 | 2000 | 2001 | 2002 | 2003 | 2004 | TOTAL |
|-------------|-------|------|------|------|------|------|------|------|------|------|------|-------|
| SYSTEM QTY  | 0     | 100  | 150  | 150  | 200  | 200  | 0    | 0    | 0    | 0    | 0    | 800   |
| UNIT QTY    | 0     | 100  | 150  | 150  | 200  | 200  | 0    | 0    | 0    | 0    | 0    | 800   |
| CUM UNITS   |       | 100  | 250  | 400  | 600  | 800  |      |      |      |      |      |       |

CONTRACT SYSTEM QUANTITY:      800  Total production system quantity
CONTRACT UNIT QUANTITY:        800  Total production unit quantity NOTE: Average touch labor estimated for each process is based on the 200th unit. Costs are calculated based on program build schedule and represented at True Lot Midpoint (TLMP) in constant year dollars as defined above.

Cover Sheet / Process Worksheet /

Ready                                                             NUM

FIG. 9

Microsoft Excel-SCRNPRT.XLS

File Edit View Insert Format Tools Data Window Views Help

| | A | B | C | D | E | AF | AG | AH | AI | AJ | AK | AL |
|---|---|---|---|---|---|---|---|---|---|---|---|---|
| 1 | INTERCONNECT TECHNOLOGY | | Rev. n/c | | | | | PROCESS WORKSHEET | | | | |
| 2 | Analysis by: M.J. Kelly | | | | | | | Assembly Name: Some Wire Harness | | | | |
| 3 | Date: March 28, 1995 | | | | | | | Part No.: 1234567-1, Rev. A | | | | |
| 4 | File name: C:\PCAT\DATA\SCRNPRT.XLS | | | | | | | NHA: 1234568-1 | | | | |
| 5 | Cost | $11.71 | 35% | NVA | | | | | | | | |
| 6 | CT (hrs) | 4.2 | 100% | NVA | | | | | | | TLMP @ unit 256 | |
| 7 | DPU | 0.36 | FTY | 70% | | | | | | | | $11.71 |
| 8 | Sigma | 3.87 | Worksheet Totals: | | | $0.00 | $4.35 | $4.35 | 35% | $8.05 | | Total Cost |
| 9 | Oper # | Process | descripter | Proc code | Qty | Scrap Cost(LO) | Rework Cost(LO) | NVA Cost (LO) | Percent NVA | Theoretical Cost(LO) | Total Cost (LO) | @ TLMP (LO) |
| 10 | Model | Wire Stripe, Single Conductor | | | | | | | | | | |
| 11 | Model | Wire Stripe, Single 18 awg, Three S | | | 40 | $0.00 | $4.35 | $4.35 | 35% | $8.05 | $12.40 | $11.71 |
| 12 | Model | Wire Stripe, Multi-Conductor | | | | | | | | | | |
| 13 | Model | Wire Twist | | | | | | | | | | |
| 14 | Model | Lay Table | | | | | | | | | | |
| 15 | Model | Route Wire/Cable | | | | | | | | | | |
| 16 | Model | Contact Termination | | | | | | | | | | |
| 17 | Model | Inline Termination | | | | | | | | | | |
| 18 | Model | Contact Pin Insertion | | | | | | | | | | |
| 19 | Model | Strain Relief | | | | | | | | | | |
| 20 | Model | Marking | | | | | | | | | | |
| 21 | | | | | | | | | | | | |
| 22 | | | | | | | | | | | | |
| 23 | END OF FILE! Use the "INSERT" button if additional | | | | | | | | | | | |
| 24 | INSERT | lines are needed. | | | | | | | | | | |

Cover Sheet / Process Worksheet

Ready

FIG. 10

| | A | B | C | D | E | T | U | V | W | X | Y |
|---|---|---|---|---|---|---|---|---|---|---|---|
| 1 | INTERCONNECT TECHNOLOGY | | Rev. n/c | | | | PROCESS WORKSHEET | | | | |
| 2 | Analysis by: M.J. Kelly | | | | | | Assembly Name: Some Wire Harness | | | | |
| 3 | Date: March 28, 1995 | | | | | | Part No.: 1234567-1, Rev. A | | | | |
| 4 | File name: C:\PCAT\DATA\SCRNPRT.XLS | | | | | | NHA: 1234568-1 | | | | |
| 5 | Cost | $11.71 | 35% | NVA | | | | | | | |
| 6 | CT (hrs) | 4.2 | 100% | NVA | | | | | | | |
| 7 | DPU | 0.36 | FTY | 70% | | | | | | | |
| 8 | Sigma | 3.87 | Worksheet Totals: | | | 0.000 | 0.174 | 0.174 | 35% | 0.322 | 0.496 |
| 9 | Oper # | Process | descripter | Proc code | Qty | Scrap HPU | Rework HPU | NVA HPU | Percent NVA | Theoretical HPU | Total HPU |
| | | | | | | | | HOURS PER UNIT | | | |
| 10 | Model | Wire Stripe, Single Conductor | | | | | | | | | |
| 11 | Model | Wire Stripe, Single, 18 awg, Three | | | 40 | 0.000 | 0.174 | 0.174 | 35% | 0.322 | 0.496 |
| 12 | Model | Wire Stripe, Multi-Conductor | | | | | | | | | |
| 13 | Model | Wire Twist | | | | | | | | | |
| 14 | Model | Lay Table | | | | | | | | | |
| 15 | Model | Route Wire/Cable | | | | | | | | | |
| 16 | Model | Contact Termination | | | | | | | | | |
| 17 | Model | Inline Termination | | | | | | | | | |
| 18 | Model | Contact Pin Insertion | | | | | | | | | |
| 19 | Model | Strain Relief | | | | | | | | | |
| 20 | Model | Marking | | | | | | | | | |
| 21 | | | | | | | | | | | |
| 22 | | | | | | | | | | | |
| 23 | END OF FILE! Use the "INSERT" button if additional | | | | | | | | | | |

FIG. 12

| | A | B | C | D | E | AM | AN | AO | AP | AQ | AR | AS | AT |
|---|---|---|---|---|---|---|---|---|---|---|---|---|---|
| 1 | INTERCONNECT TECHNOLOGY | | Rev. n/c | | | PROCESS WORKSHEET | | | | | | | |
| 2 | Analysis by: M.J. Kelly | | | | | Assembly Name: Some Wire Harness | | | | | | | |
| 3 | Date: March 28, 1995 | | | | | Part No.: 1234567-1, Rev: A | | | | | | | |
| 4 | File name: C:\PCAT\DATA\SCRNPRT.XLS | | | | | NHA: 1234568-1 | | | | | | | |
| 5 | Cost | $11.71 | 35% | NVA | | | | | | | | | |
| 6 | CT (hrs) | 4.2 | 100% | NVA | | | | | | | | | |
| 7 | DPU | 0.36 | FTY | 70% | | | | | | | | | |
| 8 | Sigma | 3.87 | Worksheet Totals: | | | 0.0 | 0.0 | 0.2 | 4.3 | 4.5 | 100% | 0.0 | 4.5 | 4.2 |
| 9 | Oper # | Process | descripter | Proc code | Qty | Scrap CT(hrs) | Rework CT(hrs) | Set-up & Delays CT(hrs) | NVA Cost CT(hrs) | Percent NVA | Theoretical CT(hrs) | Total CT(hrs) | Cycle Time @ TLMP |
| 10 | Model | Wire Stripe, Single Conductor | | | | | | | | | | | |
| 11 | Model | Wire Stripe, Single, 18 awg, Three | | | 40 | 0.0 | 0.0 | 0.2 | 4.3 | 4.5 | 100% | 0.0 | 4.5 | 4.2 |
| 12 | Model | Wire Stripe, Multi-Conductor | | | | | | | | | | | |
| 13 | Model | Wire Twist | | | | | | | | | | | |
| 14 | Model | Lay Table | | | | | | | | | | | |
| 15 | Model | Route Wire/Cable | | | | | | | | | | | |
| 16 | Model | Contact Termination | | | | | | | | | | | |
| 17 | Model | Inline Termination | | | | | | | | | | | |
| 18 | Model | Contact Pin Insertion | | | | | | | | | | | |
| 19 | Model | Strain Relief | | | | | | | | | | | |
| 20 | Model | Marking | | | | | | | | | | | |
| 21 | | | | | | | | | | | | | |
| 22 | | | | | | | | | | | | | |
| 23 | END OF FILE! Use the "INSERT" button if additional | | | | | | | | | | | | |
| 24 | INSERT | lines are needed. | | | | | | | | | | | |

FIG. 13

| INTERCONNECT TECHNOLOGY | | Rev. PT-5 | | PROCESS WORKSHEET | | | |
|---|---|---|---|---|---|---|---|
| Analysis by: M.J. Kelly | | | | Assembly Name: Wire Harness | | | |
| Date: March 28, 1995 | | | | Part No.: 1234567-0001, Rev: n/c | | | |
| File name: C:\PCAT\DATA\ITO_WS1.XLS | | | | NHA: 1234568-0001 | | | |
| Cost | $240.90 | 19% | NVA | | Trade Study | | |
| CT (hrs) | 33.2 | 57% | NVA | | | | |
| DPU | 1.26 | FTY | 28% | | | | |
| Sigma | 4.11 | Worksheet Totals: | | | | | |

| | | | | | | SUMMARY | |
| | | | | | | $240.90 | 33.2 | 1.26 |

| Oper # | Process | descriptor | Proc code | Qty | dpmo | Comments | COST | CYCLE TIME (hrs) | DPU |
|---|---|---|---|---|---|---|---|---|---|
| PC Model | Wire Stripe, Single Conductor | | | | 4,554 | | | | |
| | Wire Stripe, Single, 18 awg, Three Strip | | | 30 | 9,015 | | $15.29 | 5.8 | 0.27 |
| | Wire Stripe, Single, 24 awg, Two Strip | | | 21 | 7,776 | | $7.04 | 5.5 | 0.16 |
| | Wire Stripe, Single, 24 awg, One Strip | | | 9 | 7,438 | | $5.75 | 5.5 | 0.07 |
| PC Model | Wire Stripe, Multi-Conductor | | | | | | | | |
| PC Model | Wire Twist | | | | | | | | |
| | Wire Twisting, 3 to 4.5 per inch, 20 t | | | 2 | 2,733 | | $9.95 | 0.4 | 0.01 |
| | Wire Twisting, 1 to 2.5 per inch, 18 d | | | 6 | 1,823 | | $10.18 | 0.4 | 0.01 |
| PC Model | Lay Table | | | | | | | | |
| Route | Route Wire/Cable | | | 1 | 50 | | $29.40 | 1.2 | 0.00 |
| Tape | Tape Segment | | | 12 | 50 | | $4.55 | 0.2 | 0.00 |
| Flat Lace | Flat Lace Segment | | | | 1,000 | | $0.00 | 0.0 | 0.00 |
| Non-shrink | Install Braid Segment | | | | 50 | | $0.00 | 0.0 | 0.00 |
| Shrink Slv | Non-shrink Sleeve Segment | | | 2 | 50 | | $0.00 | 0.0 | 0.00 |
| | Shrink Sleeve Segment | | | 8 | 50 | | $0.89 | 0.0 | 0.00 |
| | Cable Tie | | | | 230 | | $1.52 | 0.1 | 0.00 |
| | Lacing Cord | | | | | | $0.00 | 0.0 | 0.00 |
| PC Model | Contact Termination | | | | | | | | |
| | Contact Termination, Solder, 16-18, 2 | | | 60 | 10,240 | | $76.82 | 3.1 | 0.61 |
| | Contact Termination, Crimp, 22 to 26 | | | 60 | 3 | | $12.35 | 0.5 | 0.00 |
| PC Model | Inline Termination | | | | | | | | |
| PC Model | Contact Pin Insertion | | | | | | | | |
| | Contact Insertion, 26 to 55, Grid/Num | | | 2 | 1,144 | | $39.33 | 1.6 | 0.00 |
| PC Model | Strain Relief | | | | | | | | |
| | Strain Relief, RTV potting, min, max, | | | 2 | 5,463 | | $23.24 | 8.8 | 0.01 |
| | Strain Relief, Sleeve (sngl wire), min,n | | | 60 | 1,823 | | $4.56 | 0.2 | 0.11 |
| PC Model | Marking | | | | | | | | |
| | Sym, Bandmaker, Typewriter (paper), | | | 1 | 1,368 | | $0.03 | 0.0 | 0.00 |

FIG. 19

Microsoft Access–[Finishes]

File  Edit  View  Records  Window  Help

| Painting | Mask/demask | Marking | Heat treat |
| Alodine | Anodize | Passivate | Plating |

Class of Chromate
- ● Class 1A, mthd 01
- ○ Class 3, mthd 01
- ○ Cold type, mthd 05
- ○ Touch-up, mthd 05

Cube size
- ○ 1/2" cube
- ○ 6" cube
- ● 12" cube
- ○ 18" cube
- ○ 18"+cube

Casting grade
- ○ Type A
- ○ Type B
- ○ Type C
- ○ Type D
- ● None

Casting type
- ○ Permanent
- ○ Die
- ○ Investment
- ○ Sand
- ● None $32ea.

4.8 σ

Surface finish
- ○ Machined
- ○ Etched
- ○ Glass-bead
- ○ Rough
- ● N/A

Weight
- ● 0-28 lbs.
- ○ 29-99 lbs.
- ○ 100+lbs.

Heat treatment
- ○ Etched   ○ Oxides
- ○ HT (<1% Si)   ○ HT (>1% Si)

Miscelaneous
- ○ Different substrate alloys
- ○ Crevices less than .060"
- ○ Post alodined dim's <+/-.001
- ○ Blind alodined holes <.060"
- ○ Thru alodined holes <.060"
- ○ Pieces welded or fastened
- ○ Poor chemical drainage 2.5 days

99%

Cost, quality, ct of finish process

MIL-C-5541 (F-021)   [Main menu]   [Part type menu]   [Previous screen]

FIG. 20

Microsoft Access–[Finishes(Anodize)]

File  Edit  View  Records  Window  Help

| Painting | Mask/demask | Marking | Heat treat |
| Alodine | Anodize | Passivate | Plating |

Type of anodize
- ○ Sulfuric, type II  F-023
- ○ Hard, type III  F-025
- ○ Chromic, type I  F-024
- ○ Phosphoric,  F-012

Casting grade
- ○ Type A
- ○ Type B
- ○ Type C
- ○ Type D
- ● None

Casting type
- ○ Permanent
- ○ Die
- ○ Investment
- ○ Sand
- ● None

Cube size
- ○ 1/2" cube
- ○ 6" cube
- ● 12" cube
- ○ 18" cube
- ○ 18"+ cube $32ea.

4.8 σ

Anodize seal
- ○ Color dyed and sealed
-   ○ Black
-   ○ Olive drab
-   ○ Other color
- ○ Clear and sealed
- ● Clear only

Weight
- ● 0-28 lbs.
- ○ 29-99 lbs.
- ○ 100+lbs.

Anodize thickness
- ○ Less than F-Spec
- ○ +.001 to +.004
- ○ Min thickness note
- ● Dim's apply after process

Miscelaneous
- ○ Different substrate alloys
- ○ Crevices less than .060
- ○ Post anodize dim's <+/-.001
- ○ Blind anodized holes <.060
- ○ Thru anodized holes <.060
- ○ Pieces welded or fastened
- ○ Poor chemical drainage 2.5 days

99%

Cost, quality, ct of finish process

MIL-A-8625   [Main menu]   [Part type menu]   [Previous screen]

FIG. 21

Microsoft Access-[Passivate]

File  Edit  View  Records  Window  Help

Tabs: Painting | Mask/demask | Marking | Heat treat
Tabs: Alodine | Anodize | Passivate | Plating

Cube size
- ○ 1/2" cube
- ○ 6" cube
- ● 12" cube
- ○ 24" cube
- ○ 24"+cube

Casting grade
- ○ Type A
- ○ Type B
- ○ Type C
- ○ Type D
- ● None

Casting type
- ○ Permanent
- ○ Die
- ○ Investment
- ○ Sand
- ● None

Heat treatment
- ○ Descaled
- ○ Oxide/scale
- ○ Carburized or Nitrided
- ● None

Surface finish
- ○ Polished
- ○ Machined
- ○ Glass-bead
- ○ Sand blast
- ○ Rough
- ● N/A

Weight
- ● 0-28 lbs.
- ○ 29-99 lbs.
- ○ 100+lbs.

Drainage
- ● Good  ○ Poor

Miscelaneous
- ○ Different substrate alloys
- ○ Crevices less than .060"
- ○ Thru passivated holes <.060"
- ○ Blind passivated holes <.060"
- ○ Post passivated d'm's <+/-.0005
- ○ Hardness > 38 after machining
- ○ Hardened > 38 HRC $32ea.

4.8 σ

2.5 days

99%

Cost, quality, ct of finish process

QQ-P-35 (F-016) | Main menu | Part type menu | Previous screen

FIG. 22

Microsoft Access-[Plating]

File  Edit  View  Records  Window  Help

Tabs: Painting | Mask/demask | Marking | Heat treat
Tabs: Alodine | Anodize | Passivate | Plating

Plating Material
- ○ Aluminum IVD         MIL-C-83488      (F-694)
- ○ Cadmium              QQ-P-416         (F-046)
- ○ Chromium             QQ-C-320         (F-045)
- ○ Copper               MIL-C-14550      (F-041)
- ○ Electroless Nickel   MIL-C-26074      (F-038)
- ○ Gold plating         MIL-G-45204      (F-039)
- ○ Nickel plating       QQ-N-290         (F-042)
- ○ Nickel strike        None             (F-019)
- ○ Silver plating       QQ-S-365         (F-040)
- ○ Tin plating          MIL-T-10727      (F-048)
- ○ Tin, hot dipped      MIL-T-10727,II   (F-047)
- ○ Tin, immersion       MIL-T-81955      (F-352)
- ○ Zinc plating         ASTM B633        (F-084)
- ○ Polyester impregnate MIL-STD-276,I    (F-074)
- ○ Anaerobic impregnate MIL-STD-276,II   (F-074)

Miscelaneous
- ○ Different substrate alloys
- ○ Crevices/blind holes <.060"
- ○ Thru plated holes <.060"
- ○ Post plated dim's < +/-.001
- ○ Poor part drainage
- ○ Leak test required
- ○ Corrosion resistance tests
- ○ Wear resistance tests
- ○ Solderability tests
- ○ Electrical conductivity tests
- ○ Non-magnetic tests
- ○ Pieces welded or fastened

Cube size
- ○ 1/2" cube   ● 12" cube
- ○ 6" cube     ○ 12"+cube $32ea.

4.8 σ

2.5 days

99%

Cost, quality, ct of finish process

Plating process | Main menu | Part type menu | Previous screen

Microsoft Access-[Finishes (painting)]

File  Edit  View  Records  Window  Help

| Alodine | Anodize | Passivate | Plating |
| Painting | Mask/demask | Marking | Heat treat |

Top Coat Paint
- ● Epoxy paint         MIL-C-22750  (F-159)
- ○ Urethane            MIL-C-85285  (F-168)
- ○ Urethane (CARC)     MIL-C-46168  (F-169)
- ○ Lacquer (spray can) N/A          (F-173)
- ○ Light diffusing paint N/A        (F-191)
- ○ Powder coat, mthd 01 MIL-C-22750 (F-167)
- ○ Powder coat, mthd 02 MIL-C-22750 (F-167)
- ○ Powder coat, mthd 03 MIL-C-22750 (F-167)
- ○ Powder coat, mthd 04 MIL-C-22750 (F-167)

Primer Coat
- ○ Epoxy (lead free)  MIL-P-53030  (F-182)
- ○ Epoxy              MIL-P-85582  (F-180)
- ○ Epoxy              MIL-P-23377  (F-079)
- ○ Zinc chromate      TT-P-1757    (F-053)

Miscelaneous
- ○ Numerious interior features
- ○ Numerious overall features
- ○ Non-standard FED or TI color(s)
- ○ Overspray permissable note
- ○ Dry film lubrication (F-132)

Separate colors
- ● One       ○ Three
- ○ Two       ○ Four

Finish
- ● Flat       ○ Glossy
- ○ Semi-gloss ○ Textured

Cube size
- ○ 1/2" cube  ● 12" cube
- ○ 6" cube    ○ 12"+cube $32ea.

4.8 σ

2.5 days

99%

Cost, quality, ct of finish process

Painting process    [Main menu]  [Part type menu]  [Previous screen]

Microsoft Access-[Finishes (Mask/Demask)]

File  Edit  View  Records  Window  Help

| Alodine | Anodize | Passivate | Plating |
| Painting | Mask/demask | Marking | Heat treat |

Surfaces free of only paint:

Cost Index Factors:

| Factor | Feature description: | Process: | Quantity |
|---|---|---|---|
| 1.0x | Total # of holes <1" dia. | (cork stopper) | 0 |
| 2.0x | Total # of std. surface diameters | (tape tabs) | 0 |
| 2.1x | Total # of threaded holes | (screws/cork) | 0 |
| 2.2x | Total # of countersinks | (split tape tabs) | 0 |
| 3.3x | Total # of surfaces or areas | (masking tape) | 22 |

Surfaces free of chemical finishes and paint:

Cost Index Factors:

| Factor | Feature description | Process | Quantity |
|---|---|---|---|
| 6.0x | Total # of holes/threads <1" dia. | (rubber stopper) | 0 |
| 8.9x | Total # of std. surface diameters | (plastic tabs) | 0 |
| 9.3x | Total # of countersinks | (split plastic tabs) | 0 |
| 10.2x | Total # of surfaces or areas | (turco, painted) | 0 |

Cube size   ● 6" cube   ○ 12" cube   ○ 24" cube   ○ 24"+ cube $32 ea.

4.8 σ

2.5 days

99%

Cost, quality, ct of finish process

Masking process    [Main menu]  [Part type menu]  [Previous screen]

Microsoft Access – [Finishes (marking)]
File  Edit  View  Records  Window  Help Tabs: Alodine | Anodize | Passivate | Plating | Painting | Mask/demask | Marking | Heat treat

Marking type

Cost Index Factors:
| | |
|---|---|
| 1.0x | ○ Bag and tag — MIL-STD-130 ( N/A ) |
| 2.0x | ○ Rubber stamp — MIL-STD-454 (F-902) |
| 2.6x | ○ Metal stamp — MIL-STD-454 (F-906) |
| 3.0x | ○ Chemical etch — MIL-STD-454 (F-903) |
| 4.6x | ○ Silk screen — MIL-STD-454 (F-901) |

Group/areas: 1, #Name?, #Name?, #Name?, #Name?

Largest side sq/in
- ● 25 sq/in (ie., 5"x5")
- ○ 100 sq/in
- ○ 200 sq/in
- ○ >200 sq/in

Locational requirements
- ● General location only note
- ○ Locations +/-.030 tolerance
- ○ Locations< +/-.030 tolerance

Miscelaneous
- ○ Markings on curved surface
- ○ Markings on two sides
- ○ Markings on three sides
- ○ Markings on four sides
- ○ Markings on interior surfaces
- ○ Markings on cast surfaces
- ○ Marking of revision letter req'd
- ○ Lettering < .060 in height $32ea.   4.8 σ   2.5 days   99%
Cost, quality, ct of finish process Marking process   [Main menu]  [Part type menu]  [Previous screen]

FIG. 26

Microsoft Access – [Finishes (heat treat)]
File  Edit  View  Records  Window  Help Tabs: Alodine | Anodize | Passivate | Plating | Painting | Mask/demask | Marking | Heat treat

Heat Treating Type:
- ○ Aluminum alloys (heated stress relief)   MIL-H-6088  (F-959)
- ○ Aluminum alloys (time delay stress relief)  MIL-H-6088  (F-959)
- ○ Beryllium copper   MIL-H-7199  (F-967)
- ○ Carburizing of steel   N/A   (F-968)
- ○ Electrical or Controlled expansion alloys   N/A   (F-956)
- ○ Nitriding or steels   MIL-S-6090  (F-695)
- ○ Stainless, austenitic   (300 series)  MIL-H-6875  (F-953)
- ○ Stainless, martensitic   (ie, 17-4PH)  MIL-H-6875  (F-955)
- ○ Stainless, martensitic   (400 series)  MIL-H-6875  (F-952)
- ○ Stainless, semi-austenitic   (ie, 17-7PH)  MIL-H-6875  (F-965)
- ● Steels, carbon or low alloy   MIL-H-6875  (F-950)
- ○ Tool steels   MIL-H-6875  (F-951)

Miscelaneous
- ○ Non-std. HT range
- ● Mat'l thickness >2"
- ○ Mat'l thickness >4"
- ○ Mat'l thickness >8"
- ● Part weight < 28 lbs
- ○ Part weight < 99 lbs
- ○ Part weight > 99 lbs
- ○ Flatness after HT Cube size:  ○ 1" cube   ● 6" cube   ○ 12" cube   ○ 12"+cube $32ea.   4.8 σ   2.5 days   99%
Cost, quality, ct of finish process Heat treating process   [Main menu]  [Part type menu]  [Previous screen]

| Assembly Items | Quantity required |
|---|---|
| Adhesive epoxy, or others | 10 |
| Bolts, hex head | 3 |
| ▶ Compound, sealing or locking | 4 |
| Fabricated parts | 3 |
| Hex nuts | 3 |
| Inserts, helical coil (standard) | 3 |
| Inserts, helical coil (tangless) | 0 |
| Miscelaneous items | 0 |
| O-rings, packing -custom | 0 |
| O-rings, packing -standard | 0 |
| Pem nuts | 0 |
| Pins, diamond -custom size | 0 |
| Pins, diamond -standard size | 0 |
| Pins, springs | 0 |
| Pins, straight -headless | 0 |
| Pins, tapered -plain | 0 |
| Ring, retaining | 0 |
| Rivet, tubular | 0 |
| Rivet, solid | 0 |
| Rivet, split | 0 |
| Screws captive -custom | 0 |

$100 each 4.5 sigma 7 days

98% yield

Cumulative cost, quality, cycle time and part yield

*FIG. 29*

CAPABILITY PREDICTOR

FIELD OF THE INVENTION

This invention relates to a method and apparatus to predict the capability of a design or process.

BACKGROUND OF THE INVENTION

Design and manufacturing cycles in the prior art have included several product redesign iterations to minimize the manufacturing product costs and cycle times and maximize the product quality. This process is very costly and time consuming. Today's competitive market require minimum product manufacturing costs and high product quality with minimum time to market cycle.

Over the past few years, quality has been addressed with process capability tools such as SSDR (Six Sigma Design Review) and Process Capability Library (PCL). The SSDR tool was developed at Texas Instruments and has been used and published by the International Casting Institute.

The PCL is a process capability tool for quality analysis. This is described in U.S. Pat. No. 5,452,218 of Tucker, et al. Entitled "System and Method for Determining Quality Analysis of Fabrication and/or Assembly Design Using Shop Capability Data", issued Sep. 19, 1995. This patent is incorporated herein by reference.

SUMMARY OF THE INVENTION

In accordance with one embodiment of the present invention, a capability predictor comprises a database of capability data of multiple characteristics, an interactive input means for selecting characteristics, a computer processor responsive to said selected characteristics and according to prediction algorithm for generating signals representing capability prediction.

These and other features of the invention will be apparent to those skilled in the art from the following detailed description of the invention, taken together with the accompanying drawings.

DESCRIPTION OF THE DRAWINGS

In the drawing:

FIG. 3 is an Excel Spreadsheet illustrating a sample model for a wire stripe process;

FIG. 4 is a technology worksheet using Excel;

FIG. 7 is a technology worksheet with a user defined input;

FIG. 8 is a program cover sheet with a manufacturing profile;

FIG. 9 is a technology worksheet with labor cost detail with applied overhead;

FIG. 10 is a technology worksheet with labor cost detail in hours per unit;

FIG. 12 is a technology worksheet with cycle time detail;

FIG. 13 illustrates a technology worksheet with completed user input;

FIG. 19 illustrates an alodine finish process screen;

FIG. 20 illustrates another anodize finish process screen;

FIG. 21 illustrates a passivate finish process screen;

FIG. 22 illustrates a plating finish process screen;

FIG. 23 illustrates a painting finish process screen;

FIG. 24 illustrates a mask/demask finish process screen;

FIG. 25 illustrates a marling finish process screen;

FIG. 26 illustrates a heat treat finish process screen;

FIG. 29 illustrates an assembly input screen;

DESCRIPTION OF PREFERRED EMBODIMENTS

Each individual design dictates the majority of all manufacturing costs quality and cycle time. To make a significant impact on these metrics, the designer must understand the interrelationship among product design characteristics, manufacturing costs, quality, cycle time, and design function trade-offs. The present invention is a method and apparatus to interactively determine the manufacturing cost, quality, and cycle time of a design based on product design characteristics.

Figure 1:
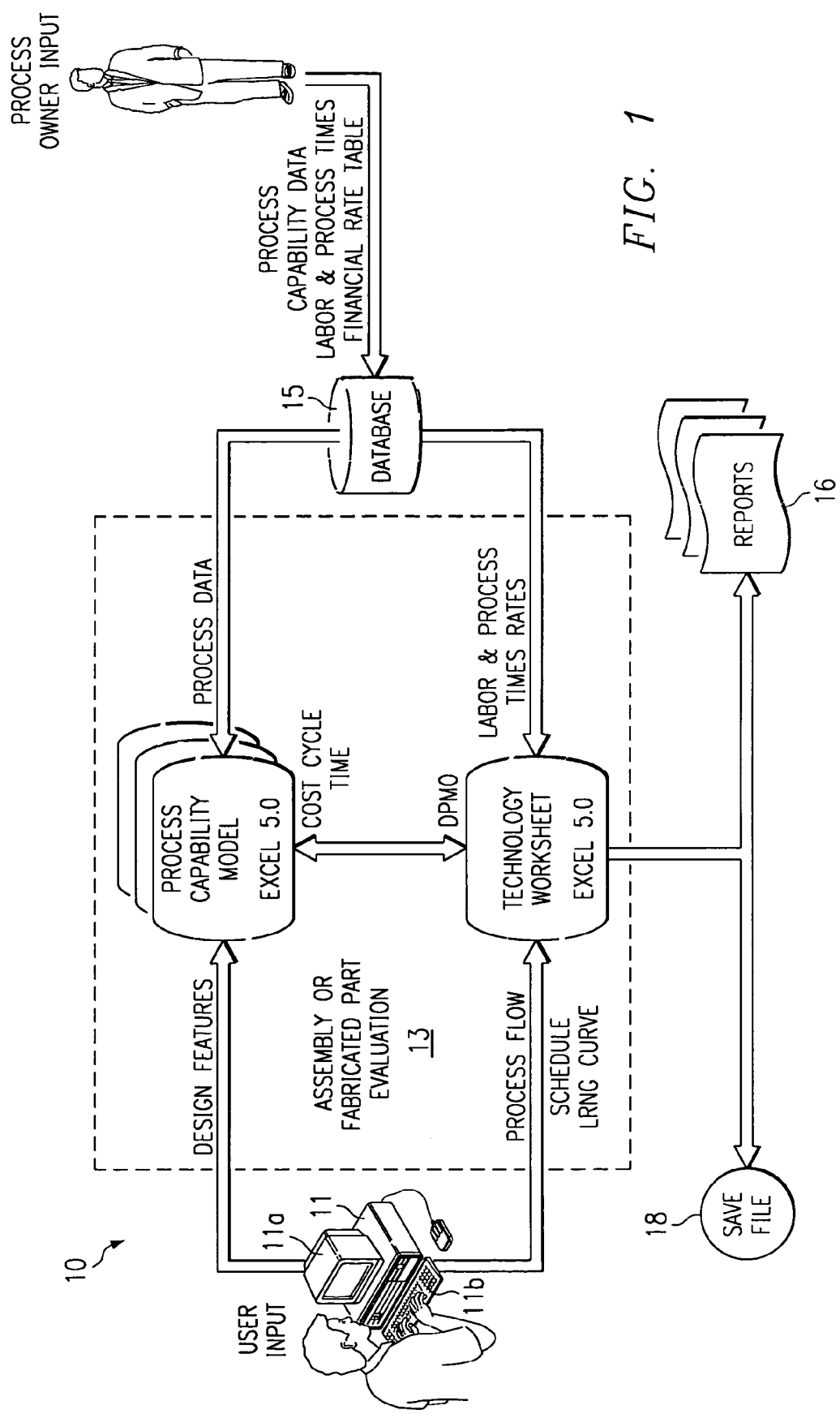
FIG. 1 is a block diagram of the system according to one embodiment of the present invention.

Referring to FIG. 1 there is illustrated a block diagram of the system according to the present invention. The components include a processor 11 including a computer 11 and display 11a with a keyboard 11b and mouse input 11d which may be, for example, an Intel Pentium processor or an Intel 486 processor or equivalent. The system further includes a windows program such as Windows 3.1 or Windows '95 operating system. The system may also be a UNIX workstation. The system also includes, for example, a Microsoft Excel 5.0 or other spreadsheet or database software package like Lotus 1-2-3. The system, as discussed previously, includes a database 15 which stores the process capability data which includes costs, quality, and cycle time models. The system may also include Access 2.0 database software and a software interface. The system 10 may include a printer display 16 for printing reports. The reports may also be stored on a file 18 and accessed by the computer 11 and displayed on a display or if connected to a network display on another computer terminal or printer.

The program in the computer 11, for example, generates screens such as Excel screens for the model builder and for the user. The screens request inputs from the model builder and user for generating the database and/or models. For the model builder, the builder inputs the feature, the quality factor such as DPMO, cost, and cycle time, with a heading of the sources name and address. A table is made up for each technology and filled out by the model builder. For the user's screens, for example, for a given technology, the quality factor such as DPMO, cost, and cycle time are presented for each feature for a given selected technology. The software developer puts behind the appropriate cells the equations necessary to calculate, for the user, the DPMOs for the selected design characteristics, the cycle time, and the cost.

The models are the process quality or dpmo prediction model, the manufacturing process cost prediction model, and a manufacturing process cycle time prediction model. In the descriptions that follow, the following nomenclature is used:

Product Quality—Defects per Unit (DPU)
$DPU_{scrap}$—Scrap causing defects per unit for a process
$DPU_{rework}$—Repairable defects per unit for a process
Process Capability—Defects per Million Opportunities (dpmo)
Opportunity—The opportunity in a design to create or incorporate a manufacturing defect
Cost—The labor and overhead costs incurred in the manufacture of a particular product design.
HPU—Manufacturing labor in hours per unit
FTY—First pass inspection yield for a process in percent
Total Hours per Unit—manufacturing labor hours per unit plus defect repair and rework labor hours
True Lot Midpoint (TLMP)—The manufactured unit which theoretically represents the average cost of a lot quantity of manufactured units
Cycle Time—The total time a product in the manufacturing cycle from raw material to finished product
% NVA—(percent non-value added) the percent of the total hours per unit spent in manufacturing repair and/or rework operations.
Attributes Data—Process defects are identified using go/no-go or good/bad quality criteria.
LO—Labor and Overhead
DPMO Range—The full range of defect rates experienced in the manufacturing process.
BC DPMO—Best Case DPMO, the lower of the two end points of the DPMO range.
WC DPMO—Worst Case DPMO, the highest of the two end points of the DPMO range.

The manufacturing process quality capability data, the manufacturing cost capability data, and the manufacturing cycle time data is entered by a process owner and stored in the database 15. This may be by the same computer terminal or a separate computer terminal coupled to the database 15 as shown in system in cited U.S. Pat. No. 5,452,218 where PC Telnet or a SUN workstation interfaces to the data file in a file server via a LAN.

Figure 2:
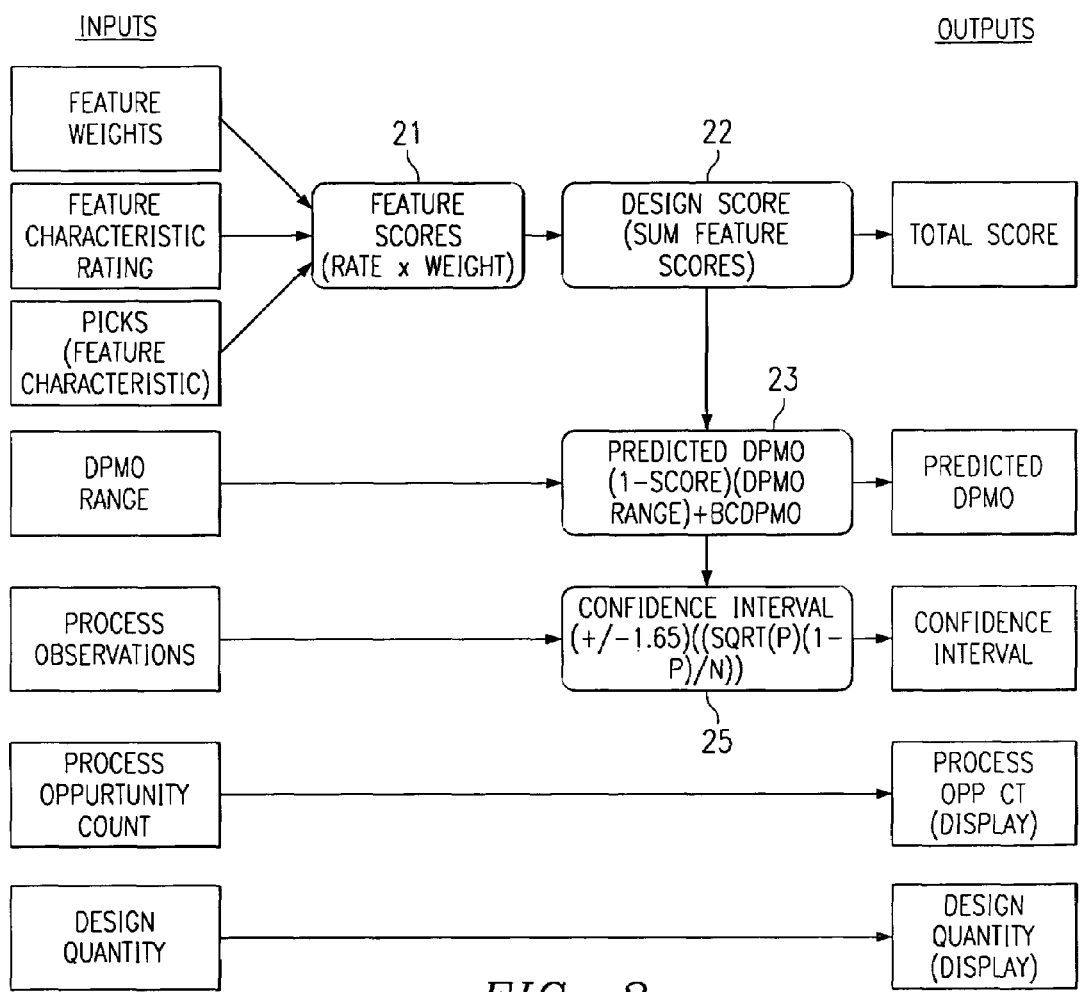
FIG. 2 illustrates quality model data flow.

Referring to FIG. 2, there is illustrated the data flow of a quality predictor using the quality process capability model. The user and process owner (expert) inputs to the model are shown at the left and outputs are provided as shown at the right in FIG. 2. The model calculations are depicted with the equations and the transform boxes between the inputs and outputs. The feature weights and feature characteristic ratings are input by the process owners and the feature picks by the user. The score is calculated by the transform equations represented by blocks 21 and 22, where each feature is scored at the appropriate spreadsheet cell location represented by block 21 and summed (block 22) and put in the totals block. The DPMO range is input by the process owner (expert) with minimum for minimum DPMO and a maximum DPMO for maximum anticipated for lowest score. The transform equation (block 23) reads the DPMO range and the score in block 22 and generates the predicted DPMO. The outputs at the right are displayed on the screens.

A team of process experts analyzes the process output data for a substantial production period and develops a design feature predictive model of the process. The accuracy and precision of the model is determined by the quantity and quality of the defect data reviewed. The model can be as precise as a historical regression model if the defect can be mapped to a design feature and there is sufficient data to generate high confidence levels. Because very few manufacturing shops keep a detailed catalog of historical defect data, an engineering estimate is used to further develop a first order process model, which is refined over time as more process data is collected and analyzed by the process expert team.

The process owner inputs the model header information such as process consultant, phone number of consultant, and mail station, and the process name and with a brief description. The process owner/expert team then describes the predictive model using product design features and characteristics.

The model user selects the product feature characteristics that best describe the design along with the number of times the characteristics appear in the design. FIG. 3 illustrates on an Excel spreadsheet a sample model for the wire stripe process. This is for a single conductor wire for striping. When a wire for a harness is purchased it is usually white and the first step is to color code the wire by striping it to distinguish from other wires in a harness. The example of FIG. 3 relates to this process. A model is built for each process with data. The process owner as shown in FIG. 2 inputs the feature weights and feature characteristic rating and the user picks the features and characteristics. The user design selections are depicted by the black dots next to the design characteristic. The process owners provide the key features that drive most of the defects rate. In this case, they determine jacket material, wire gauge, length of conductor and number of the conductors to be significant, as shown in FIG. 3. Another input by the process owner is how big a driver is the feature. Jacket material drives 60% of the defect output of that process so it is given a higher weighting. The rating number is a relative number with a rating of 1 being the best, resulting in the fewest defects. All selections are rated. The rating times the weight gives the score. The scores are totaled and put on total scores 0.61. The score of 1.00 would be a perfect score where ratings are all 1's. The different jacket types have their own benefits. In the example, Teflon (ptfe) is selected. With a score of 0.61 the DPMO is 9,015. The process DPMO range is 230 to 22750. If the total score were 1.00 the DPMO would be 230.

In FIG. 2, the predicted DPMO in the output is calculated by the equation of block diagram 23 using the design score from block 22 and the input DPMO range placed by the expert. The equation is predicted DPMO=(1−score)(DPMO range)+BCDPMO. This equation for Excel is associated with the cell location for DPMO in the worksheet.

The DPMO prediction confidence interval is based on the quantity and quality of process observations available to the process owner. If little or poor quality process actual data exists, the confidence interval for a prediction can be as simple as the percentage (%) range DPMO about the predicted mean expected by the process owner. If sufficient, high quality data is available to the process owner, the process DPMO confidence interval can be determined using the equations shown in block 25 of FIG. 2 or $(+/-1.65)(\sqrt{(p)(1-p/n)})$, where p is the probability of a defect and n is the number of actual data points. The appropriate calculation methodology is chosen and maintained in the Process Capability Model (PCM) by the process owner. The prediction confidence interval is displayed to the user on the printed evaluation report output.

The tool is interactive in that the user sees the results of his/her selections in real time and can make changes if a desired result is not achieved in the design characteristic selections. The user then accepts the model to his/her technology worksheet and proceeds to the next process or design feature.

Figure 4:
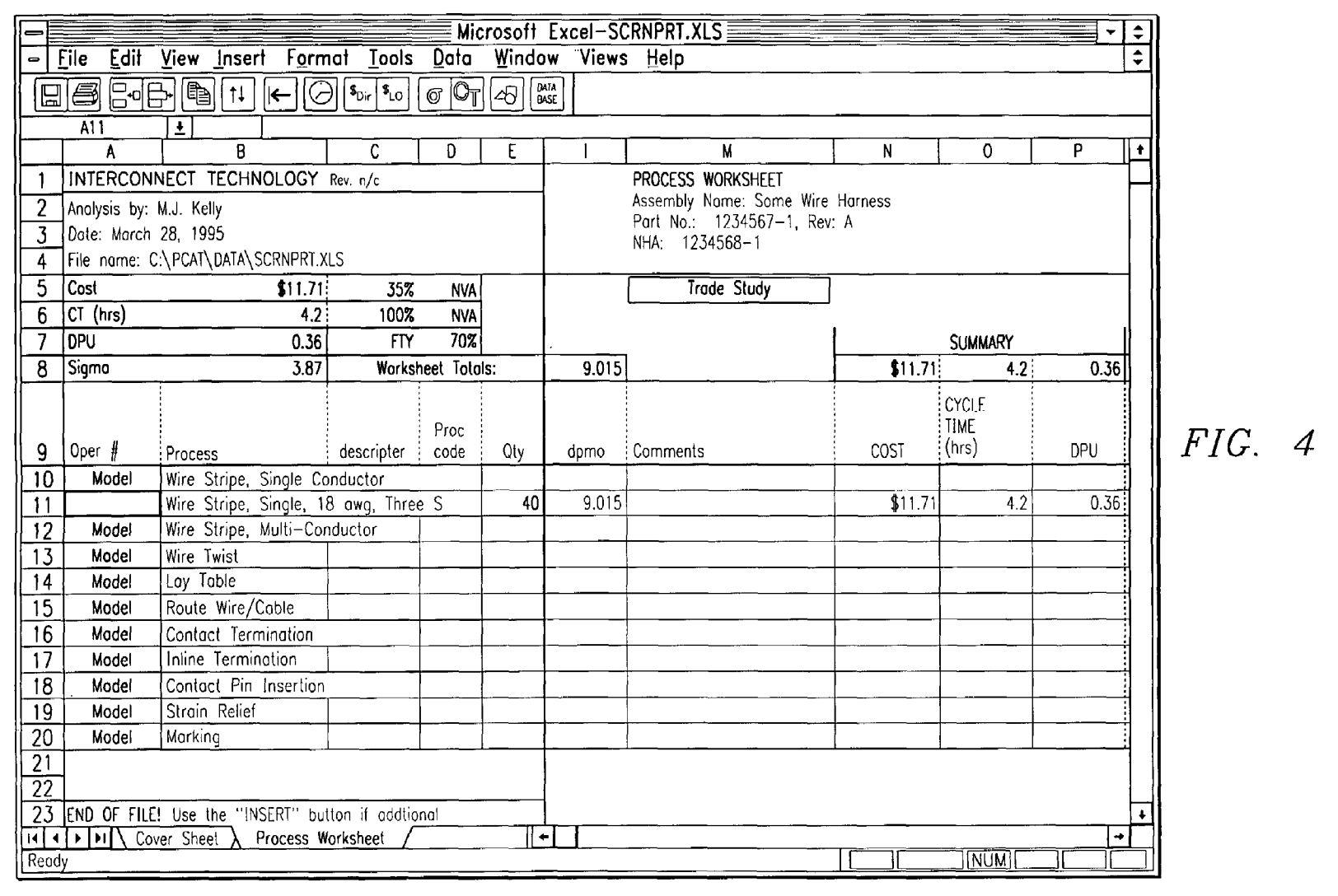

The quality model output is a process DPMO value (9015) for the product design feature characteristic selections and it is transferred to the technology worksheet in location I11 (column, row) as shown in FIG. 4.

Figure 5:
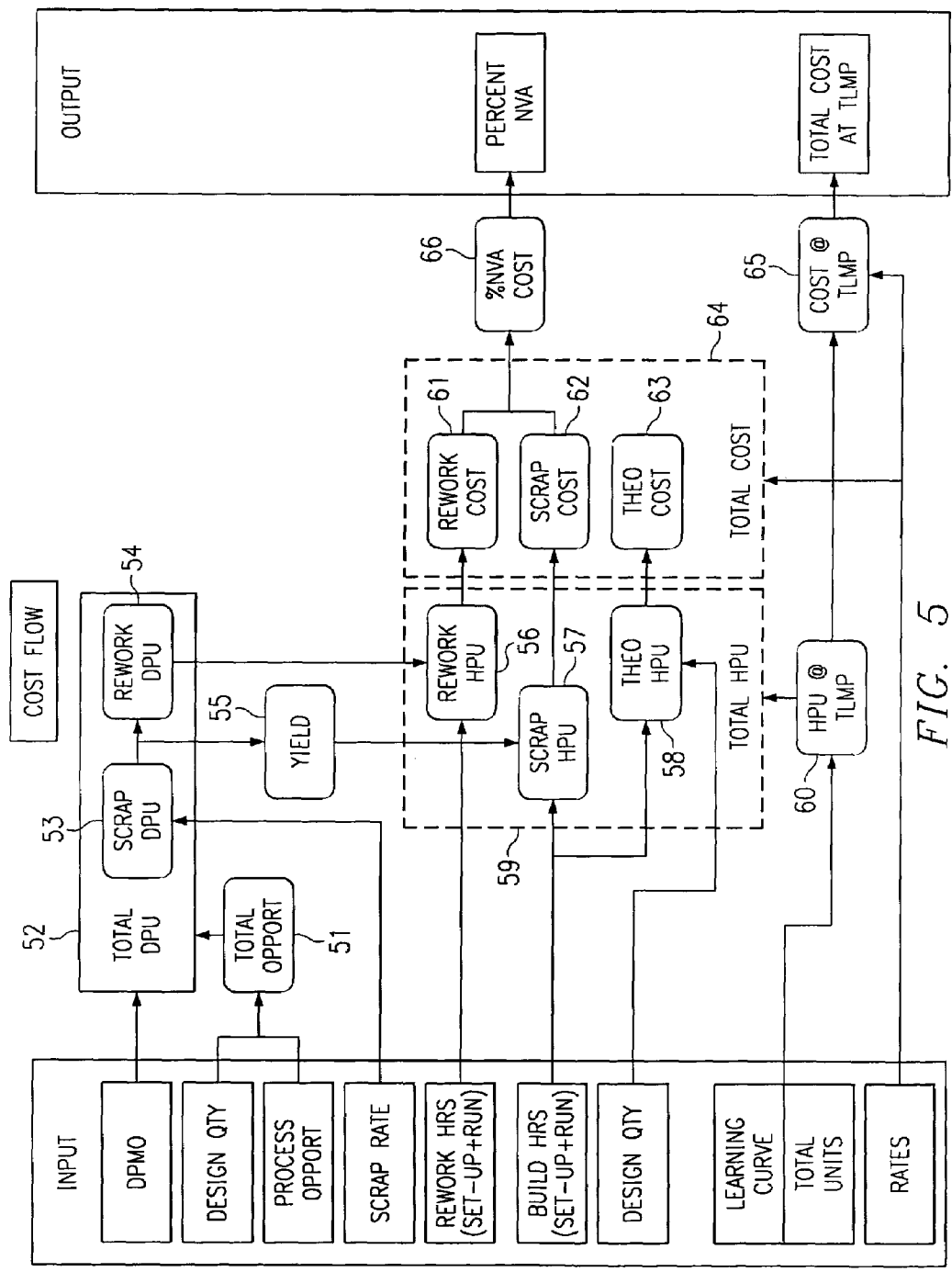
FIG. 5 illustrates cost model data flow according to one embodiment of the present invention.

A flow block diagram of the cost predictor model is shown in FIG. 5. The user and process owner inputs to the model are shown on the left and the outputs are shown on the right. The inputs are predicted DPMO (calculated above), Design Quantity and Process Opportunities, scrap rate, rework hours, build hours, learning curve and total units and rates. The design quantity is used for generating total opportunities and theoretical HPU (hours per unit). The DPMO is generated by the quality model and is used to predict the total DPU. The model calculations that occur in each data transformation blocks 51–66 are numbered and can be found in the equation Table 1 below.

TABLE 1

Cost Model Equations

51. Total Opportunities = Process Opportunities × Design Quantity
52. Total DPU = Total Opportunities × dpmo ÷ 1,000,000
53. Scrap DPU = Total DPU × Scrap Rate
54. Rework DPU = Total DPU − Scrap DPU
55. $Yield_{scrap} = e^{-DPU_{scrap}}$
56. Rework HPU = Rework Hours × $DPU_{rework}$
57. Scrap HPU = Build Hours × (1 − $Yield_{scrap}$)
58. Theoretical HPU = Build Hours × Design Quantity
59. Total HPU = Rework HPU + Scrap HPU + Theoretical HPU
60. HPU at TLMP = Total HPU × ($Unit_{TLMP}$/Unit Basis)^((LOG(Learning Curve))/LOG(2));
    where $Unit_{TLMP}$ =
        ((((Total Learned Units + 0.5)^(1 + (LN(Learning Curve)/LN(2)))) −
        (0.5^(1 + (LN(Learning Curve)/LN(2)))))/((1 + (LN(Learning Curve)
        /LN(2)))*(Total Learned Units)))^(1/(LN(Learning Curve)/LN(2)))
61. Rework Cost = Rework HPU × Labor Rates
62. Scrap Cost = Scrap HPU × Labor Rates
63. Theoretical Cost = Theoretical HPU × Labor Rates
64. Total Cost = Rework Cost + Scrap Cost + Theoretical Cost
65. Cost at TLMP = Total Cost × ($Unit_{TLMP}$/Unit Basis)^((LOG(Learning Curve))/LOG(2));
    where $Unit_{TLMP}$ =
        ((((Total Learned Units + 0.5)^(1 + (LN(Learning Curve)/LN(2)))) −
        (0.5*(1 + (LN(Learning Curve)/LN(2)))))/((1 + (LN(Learning Curve)
        /LN(2)))*(Total Learned Units)))^(1/(LN(Learning Curve)/LN(2)))
66. Percent NVA = ((Rework Cost + Scrap Cost)/Total Cost) × 100

Theoretical Cost

Theoretical cost is defined as the cost associated with a particular process or event, running from start to finish, with no defects. Theoretical cost is determined by the touch labor time required to initiate and complete the process of building a unit of product and then apply the appropriate labor pay rate and factory overhead rate.

The touch labor time for the theoretical build process is separated into two components; the time to set-up for the process, and the run time needed to complete the process. The total set-up time is amortized over the number of units processed for a single set-up—the run size. That is to say, for example, that if the process set-up allows multiple units to be prepared (fixtured, loaded in a machine, etc.) for the event of processing, then the time for set-up is divided by that number of units prepared. Run time is the observed or estimated time for processing a unit. Processing, in this context, refers to the actual act of physically changing or adding to a unit of product. The theoretical build time for the process step, then, includes the sum of the proportioned amount of set-up time plus the actual processing time multiplied by the process quantity.

Therefore,

Theoretical Cost($LO$)=((Build Set-up Time÷Run Size)+(Build Run Time×Quantity)×(Labor Rate×(1+Labor Overhead))

The theoretical build cost may vary depending on the features of the design. The combination of certain features, due to interdependencies, may result in one cost while other features may produce a cost independent of the other features of the design. The effects of design features on the cost of a design changes due to whether features have interdependencies with other features or if the feature effects are independent of other design features. As an example, a design with feature A may cost $X and a design with feature B may cost $Y, however, a design with feature A and B may cost $Z ($Z ≠$X+$Y). The set-up and run times for each instance (feature A, feature B, and features AB, for example) must be established.

Rework Cost

Rework cost is defined as the cost to rework repairable defects. Rework cost is determined in a fashion similar to theoretical cost. To determine rework cost, one must first determine the touch labor time required to initiate and complete the rework process; then apply the appropriate labor pay rate and factory overhead rate. The time required for the rework process is based on the number of defects that will be reworked/repaired.

Again, as with the theoretical touch labor time, the time for the rework process is separated into two components; the time to set-up for the rework process, and the run time needed to complete the rework process. In this case, the run time represents the processing time required to rework/repair (if feasible) one (1) defect that has been produced during the build process. To determine the total repair run time, the rework run time per defect is multiplied by the number of observed or estimated repairable defects per unit ($DPU_{rework}$) for that process step.

Therefore,

Rework Cost($LO$)=(((Rework Set-up Time×
(1−$e^{-DPU_{rework}}$))÷Run Size)+(Rework Run
Time×$DPU_{rework}$))×(Labor Rate×(1+Labor
Overhead))

As with the theoretical cost, the repair cost may also vary depending on the features of the design.

Scrap Cost

Scrap cost is defined as the cost to build additional units due to insufficient yield through a process.

The number of additional units that must be produced and the touch labor time required to produce them determines the scrap cost. It is assumed that the touch labor time for one additional unit equals the theoretical build time of producing one good unit.

To determine the number of additional units, the yield through the entire assembly process is determined. Since yield is the number of good units produced, the number of scrapped units (yield loss) are those units which were not successfully produced, or simply one minus the yield. Yield through the process is expressed as $e^{-DPU_{scrap}}$, where $DPU_{scrap}$ is the total defects per unit that have caused scrap. Defects that occur during a process that leave the unit of product unusable are scrap causing defects.

Therefore, $$\text{Scrap Cost}(LO) = \text{Theoretical Cost}(LO) \times \left[1 - \left(e^{-\sum_{i=1}^{n}(DPU_{scrap})}\right)\right];$$

where i is the $i^{th}$ process step

Scrap cost at a given process step is allocated from the total scrap cost based on the cumulative yield up to and including that process step.

Therefore,

Cumulative ScrapCost($LO$)$_i$=Theoretical Cost($LO$)$_i$×
(1−Cumulative Scrap Yield$_i$)

where i is the $i^{th}$ process step

Total Cost

Total cost of the assembly is defined as the sum of the total theoretical cost, the total rework cost, and the total scrap cost. Consequently, total cost can be calculated as the sum of the costs for each process needed to produce the assembly.

Therefore,

Total Cost($LO$)=Theoretical Cost($LO$)+Rework Cost
($LO$)+Scrap Cost($LO$)

Process Owner Data Inputs

A team of process experts determine the design features that drive or influence the cost of a product manufactured by each process for a particular technology. Set-up and run labor times are determined for each feature characteristic. Additionally, Set-up and run labor times are determined for the repair of defects generated at a process step in the manufacturing flow. The process experts will also input the fraction of total predicted defects that are scrap causing defects or repairable defects. This information is generated from a number of sources such as historical data, work measurement studies, or educated engineering judgment. The process data is refined over time as more data is collected and analyzed by the process expert team.

Figure 6:
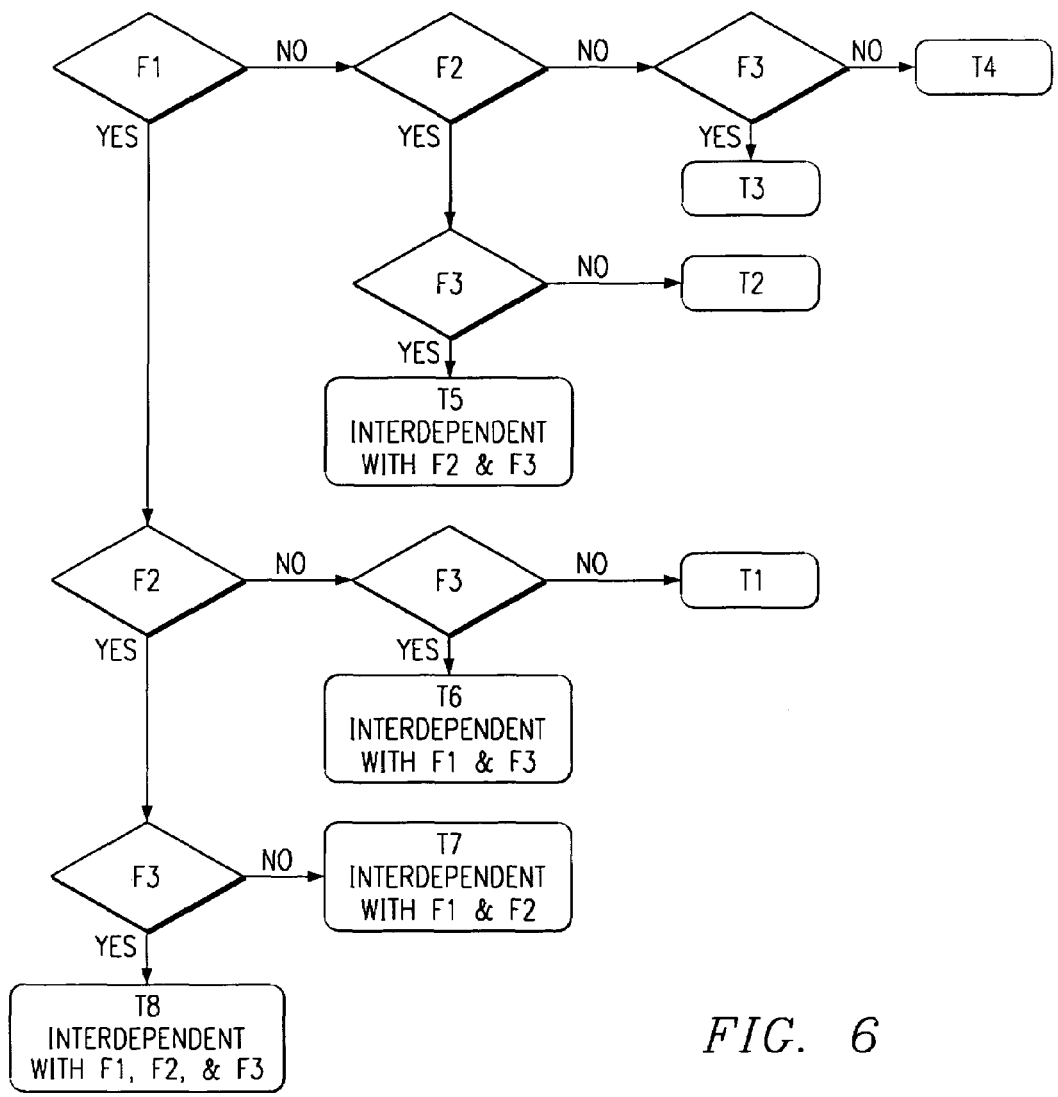
FIG. 6 illustrates time determination for a process based on feature dependencies.

The team of process experts determine the interdependencies between design features that drive different resulting labor times. In FIG. 6, an example is given of the logic test for each feature characteristic selection and whether there are dependencies with any of the other feature characteristics. In each decision block, determination is made whether the feature characteristic effects the labor time. In the example, T4 is the assembly labor time for the process when the feature characteristics are not interdependent. The features in this case do not effect the time required for the process. Times T1, T2, and T3 represent labor time for features F1, F2, and F3, respectively, that have feature characteristics that are independent of each other. On the other hand, T8 represents the labor time for a process where each of the feature characteristics are interdependent.

Additionally, T8 may have a number of different labor times associated with it depending on which feature characteristics are selected. Table 2 is an example of the possible combinations of labor times that might be expected when a process has 3 interdependent features and each feature can be one of two possible characteristics. The combinations can result in 8 different labor times, depending on which design feature characteristics are selected.

TABLE 2

Times Resulting from Feature Combinations

| Feature 1 AND | Feature 2 AND | Feature 3 | equals (=) | Time (t) |
|---|---|---|---|---|
| Characteristic 1 | Characteristic 1 | Characteristic 1 | = | t1 |
| Characteristic 2 | Characteristic 2 | Characteristic 1 | = | t2 |
| Characteristic 1 | Characteristic 2 | Characteristic 1 | = | t3 |
| Characteristic 2 | Characteristic 1 | Characteristic 1 | = | t4 |
| Characteristic 1 | Characteristic 1 | Characteristic 2 | = | t5 |
| Characteristic 2 | Characteristic 2 | Characteristic 2 | = | t6 |
| Characteristic 1 | Characteristic 2 | Characteristic 2 | = | t7 |
| Characteristic 2 | Characteristic 1 | Characteristic 2 | = | t8 |

The effects of interdependencies between design feature characteristics for a process may be different when considering repair labor time then from the effects on theoretical labor time. The team of process experts determine the type of defects that might be encountered, due to feature characteristics, and then determine the degree of difficulty to repair those type of defects, if repairable. The interdependencies are determined in the same manner as described earlier.

The labor times usually represent the time to manufacture a unit that is "fully learned", that is to say, that little additional improvement can be realized from building additional units past this predetermined unit basis. However, this $n^{th}$ unit can be any unit number established by the process expert team. The learning or improvement curve is also determined for a particular technology by the team. A table of labor rates is provided to complete the cost calculations.

As the user makes feature selections in the quality model, the effects are displayed in terms of labor cost with applied overhead (graphical representation) and the percentage of the total cost that is non-value added (% NVA), shown in the lower left corner of FIG. 3. Each selection will cause the calculation to update, showing their individual effect on both the process and the effect at the worksheet level. This will allow optimization at the process level.

User input at the worksheet level is minimal since most of the design description is accomplished in the quality model. The user has the ability to update the quantities or override model output if extenuating circumstances requires such action. Unusual design additions that are not handled by pre-established models can be added to the worksheet, as shown on row 18 in FIG. 7, and accounted for in the overall roll-up of cost, defects, and cycle time. Such inputs require judgment on the part of the user, through consultation with the process experts.

To complete the cost calculations, the manufacturing profile for each product being analyzed must be established, as shown in FIG. 8. The user must input the quantity of products, produced, whether this product had been manufactured previously to claim additional learning, the expected lot size, the production build schedule, and the labor rates desired calculations. Other header information is needed; such as, program name, user's name, analysis date, assembly name, part number and revision.

FIG. 4 shows the output of the quality model returned to the technology worksheet on row 11 in a summary level view. Other views of the technology worksheet can display detail regarding cost and labor hours, as shown in FIGS. 9 and 10.

Figure 11:
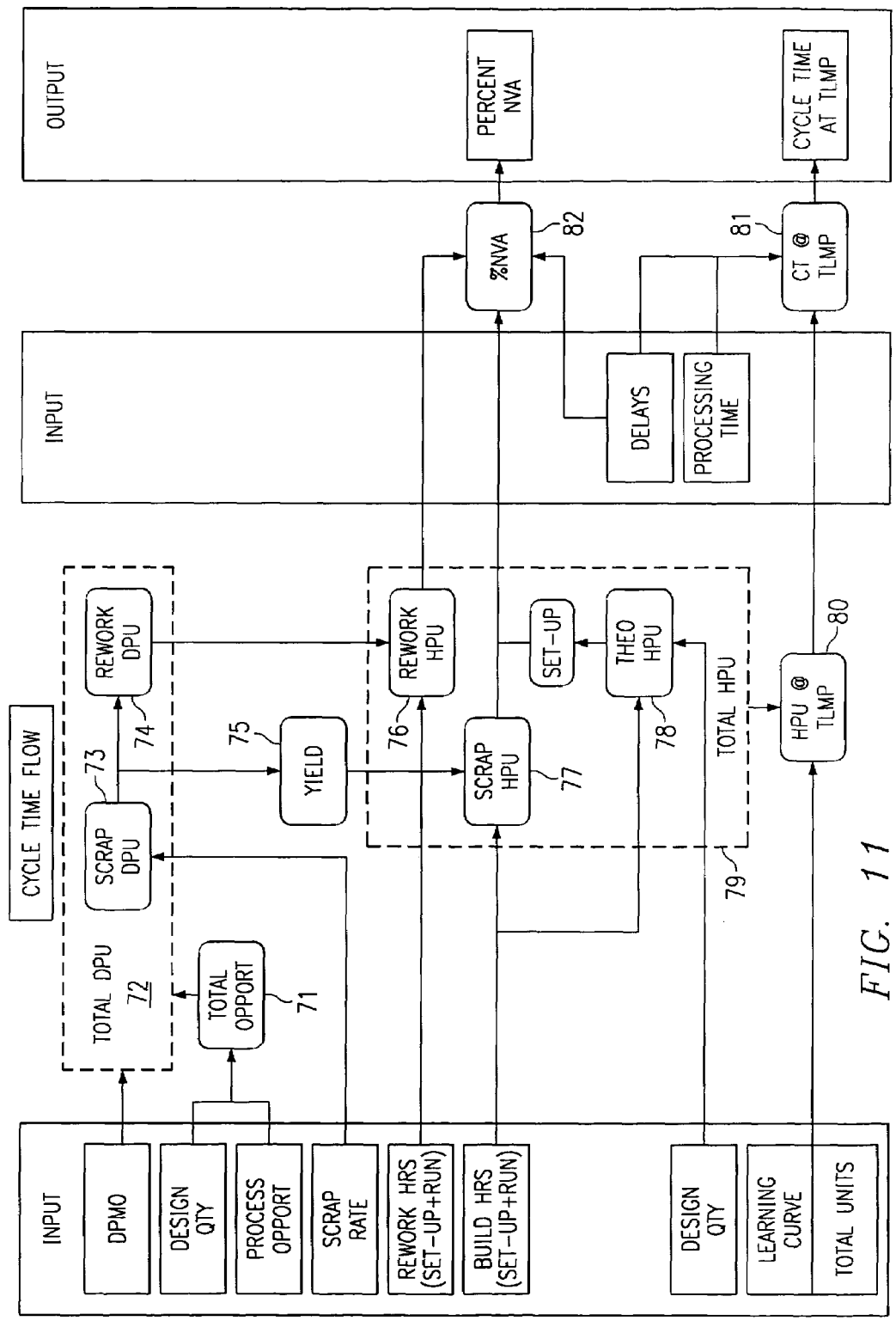
FIG. 11 illustrates cycle time model data flow.

A flow block diagram of the cycle time predictor model is shown in FIG. 11. The user and process owner inputs to the model are shown on the left and the outputs are shown on the right. The inputs are DPMO, design quality, process opportunities, scrap rate, rework hours, build hours, learning curve—total units, delays and processing time. The new inputs added are delays and processing time. The model calculations that occur in each data transformation blocks 71–82 are numbered and can be found in the equations Table 3.

The delays are defined as the time inherent to a particular process that require an item or unit being produced to set idle, without any processing adding to the value of the product. This time would include queue time while an item is at rest waiting for the next step in the process to occur. Again, delays vary depending on the features of the design.

A team of process experts determine the design features that drive or influence the processing time and delays of a product manufactured by each process for a particular technology. This information can be generated from a number of sources such as historical data, work measurement studies, or educated engineering judgment. The process data is refined over time as more data is collected and analyzed by the process expert team.

As with the cost model, the team of process experts determine the interdependencies between design features that may drive different resulting processing and delay times. The methodology that is used to determine theoretical labor times and repair times can be applied to determine the processing and delay times for a process.

As the user makes feature selections in the quality model, the effects are displayed in terms of total cycle time and the percentage of the total cycle time which is non-value added (% NVA), as shown previously in the lower left corner of FIG. 3. Each selection will cause the calculation to update, showing their individual effect on both the process and the effect at the worksheet level. This will allow optimization at the process level.

User input at the worksheet level is minimal since most of the design description accomplished in the quality model. The user has the ability to update the quantities or override

TABLE 3

Cycle Time Model Equations

71. Total Opportunities = Process Opportunities × Design Quantity
72. Total DPU = Total Opportunities × dpmo ÷ 1,000,000
73. Scrap DPU = Total DPU × Scrap Rate
74. Rework DPU = Total DPU − Scrap DPU
75. $Yield_{scrap} = e^{-DPU_{scrap}}$
76. Rework HPU = Rework Hours × $DPU_{rework}$
77. Scrap HPU = Build Hours × $(1 - Yield_{scrap})$
78. Theoretical HPU = Build Hours × Design Quantity
79. Total HPU = Rework HPU + Scrap HPU + Theoretical HPU
80. HPU at TLMP = Total HPU × $(Unit_{TLMP}/Unit\ Basis)\hat{\ }((LOG(Learning\ Curve))/LOG(2))$;
    where $Unit_{TLMP}$ =
        $((((Total\ Learned\ Units + 0.5)\hat{\ }(1 + (LN(Learning\ Curve)/LN(2)))) -$
        $(0.5\hat{\ }(1 + (LN(Learning\ Curve)/LN(2)))))/((1 + (LN(Learning\ Curve)$
        $/LN(2)))*(Total\ Learned\ Units)))\hat{\ }(1/(LN(Learning\ Curve)/LN(2)))$
81. Cycle Time at TLMP = HPU at TLMP + Processing Time + Delays
82. Percent NVA = ((Rework HPU + Scrap HPU + Theoretical HPU Set-up + Delays)
       /(Total HPU + Processing Time + Delays)) × 100

The "Processing time" is defined as time other than touch labor time associated with a particular process or event which is required to complete that particular process. This time would include such events as chemical process cure times, machine processing time (if it runs independent of an operator), oven bake, and the like. The assumption here is that the processing time is additive to the labor time associated with the process and is required as part of the entire process.

The processing time may vary depending on the features of the design. The effects of design features on the processing time of a design changes due to whether features have interdependencies with other features or if the feature effects are independent.

model output if extenuating circumstances requires such action. Unusual design additions that are not handled by pre-established models can be added to the worksheet as discussed earlier for the cost model, and as shown previously on row 18 in FIG. 7.

The manufacturing profile for each product being analyzed must be established as discussed earlier for the cost model, and as shown previously in FIG. 8.

As discussed earlier in the cost model, FIG. 4 shows the output of the quality model returned to the technology worksheet on row 11 in a summary level view. FIG. 12 shows the technology worksheet view that displays the detail regarding cycle time.

To complete the technology worksheet, the user continues to describe the design in terms of the process steps required to manufacture the product. The user selects the appropriate process capability models that coincide with the process steps. Then, for each process capability model, the design is defined by selecting the feature characteristics. The process capability model output is returned, line by line, to the technology worksheet. FIG. 13 shows an example of a completed worksheet. Each line of data on a completed worksheet represents the output from a process capability model.

Attribute models, variable models, and variable/attribute models can be used to predict the individual and cumulative manufacturing cost, quality, and cycle times. The applications supports other types of databases. In the embodiment to follow the database is Access and the following nomenclature, abbreviations and definitions are used.

| Nomenclature /Abbreviations /Definitions | |
|---|---|
| Cost | Cost of manufacturing or assembling parts including MLO. |
| Quality | The manufacturability of a design with regards to FTY loss during fabrication. |
| Cycle Time | The average number of days required during manufacturing from order placement to final delivery. |
| Sigma | A measurement of quality used to compare processes. |
| Dpmo | Defects per million opportunities |
| Dpo | Defects per opportunity |
| Opportunity | The opportunity in a design to create or incorporate a manufacturing defect. |
| MLO | Material, labor, and overhead |
| Recurring | Expenses that reoccur each time a new lot of product is machined. |
| Non-recurring | Expenses that only occur once regardless of the number of lots run, this would typically include expenses like hard tooling and N/C programming. |
| Part basis | The number of parts that the time per feature is based on i.e.. (200 parts). |
| Learning curve | The logarithmic curve that time and cost increase or decrease based on the part quantity, part basis, and percent learning curve assigned |
| Machinability factor | A factor used to adjust manufacturing time based on the Machinability of a given material type. |
| Learning curve factor | A factor used to adjust manufacturing time based on the learning curve and part quantity verses a part basis. |
| Material size factor | A factor used to adjust manufacturing time based on the size of a given part. |
| Characteristic factor | A factor associated with a characteristic of a process or feature which is used to adjust predication. |
| Percent scrap | The percent of predicted defects that will require scrapping the parts or assemblies by process. |
| Percent rework | The percent of predicted defects that will require rework by process. |
| Design feature | A physical requirement of a design which is the prominent part of a feature which adds additional design characteristic, or a specific process requirement called out on the design print. (i.e. surfaces, holes, paint, alodine, etc.) |
| Design characteristic | An individual requirement of a feature which adds additional detail to a feature or process. (i.e. surface tolerance type, paint color, etc.) |
| Attribute model | Models which predict cost, quality, or cycle time based on raw data which is expressed in percentages, ranges, and or go/no go terms. |
| Variable model | Models which predict cost, quality, or cycle time based on standard deviation, logarithmic curves or variable data. |
| Variable/attribute model | Models which predict cost, quality, or cycle time using both variables and attributes data. |
| Setup time basis | The average time of a setup per process without any judgments. |
| FTY loss | First time yield loss, or the percent of defects expected without any rework (e-dpu). |
| Rework time/feature | The amount of time to rework a part per feature based on process. |
| Previous process times | Manufacturing time accumulated prior to the current process. |
| Standard deviation | A statistical number used to describe process capability. |

Figure 14:
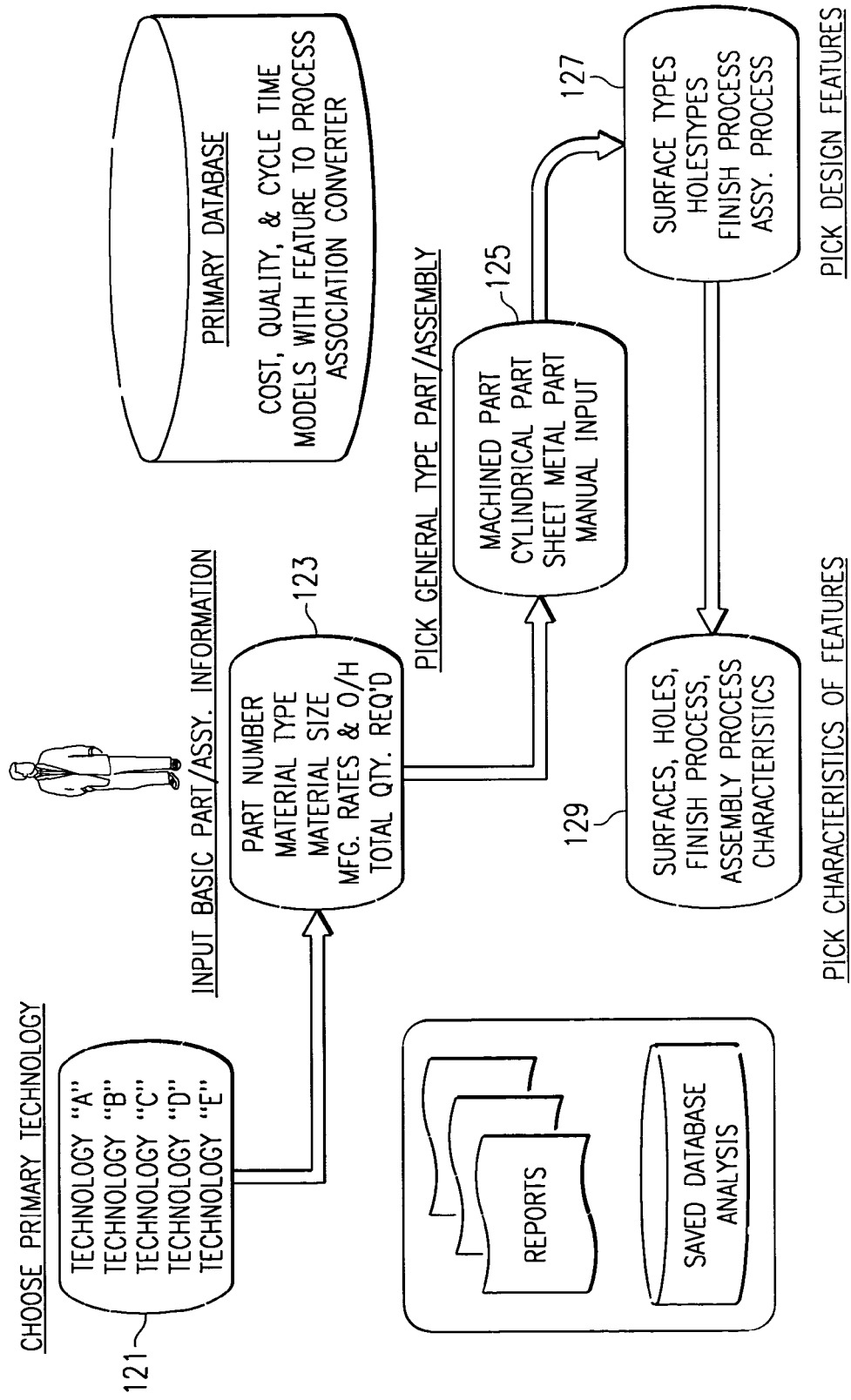
FIG. 14 illustrates information input flow in accordance to a second embodiment of the present invention.

Referring to FIG. 14 there is illustrated a graphical representation of the user input flow required of this methodology. The first step 121 is selecting the primary technology.

Figures 15, 16:
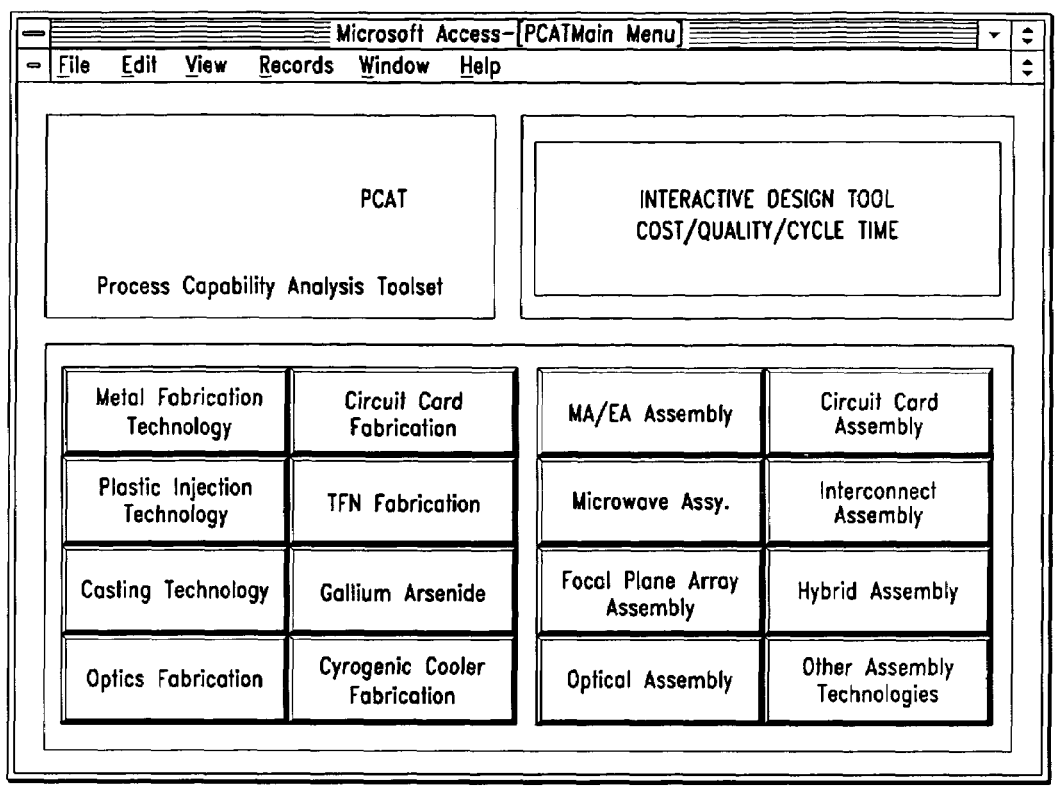
FIG. 15 illustrates a primary technology screen according to a second embodiment of the present invention.
FIG. 16 illustrates a part type menu screen.

FIG. 15 shows an actual screen used to choose the primary technology used to manufacture the individual parts or assemblies. Upon start up of the software program, this screen will be presented for the user to make his or her choice of the primary technology associated with fabricated or assembled part being designed. Options include metal fabrication, plastic injection, casting, circuit card fabrication, TFN fabrication, Gallium Arsenic, cryogenic cooler fabrication, MA/FA assembly, microwave assembly, focal plane array assembly, optical assembly, circuit card assembly, hybrid assembly, and other assembly or fabrication technologies. Each button on the screen takes the user to the next lower level of information required to either describe the features, characteristics, and or processes required to predict the cost, quality, or cycle time of fabricating individual parts or assemblies by technology area. Future graphical displays in this application will be based on the assumption that the "Metal Fabrication Technology" button was pushed here and we will be working in its technology area.

FIG. 16 shows the Part type menu which is the first menu displayed after pressing the "Metal Fabrication Technology" button on the "Primary Technology Screen 7. This is step 123 in FIG. 14. On this screen, the user inputs basic information such as material type, total part quantity, lot size, part size, part number and revision, who completed the analysis and the date. Hourly manufacturing rates, overhead charges, and other adders can be included or changed from this screen using the "Mfg. rate button. The analysis may be saved, recalled, (if completed earlier), new, printed, and viewed in a Pareto report on the screen before saving. The user views this screen initially to input data and again later after the analysis has been completed to see the overall cost of manufacturing the total quantity of parts required.

The user chooses the general part type from the pictures on the corresponding buttons. Options are machined part, cylindrical part, sheet metal part, process analysis, and manual inputs. The selection takes the user to step 125 in FIG. 14. The "process analysis" button is a manual override to directly choose process without regard to internal rules. The manual inputs" button is used for, direct cost, quality, and cycle time inputs. This corresponds to the inputs in the flow diagrams in FIGS. 2, 5, and 11 above.

Figure 17:
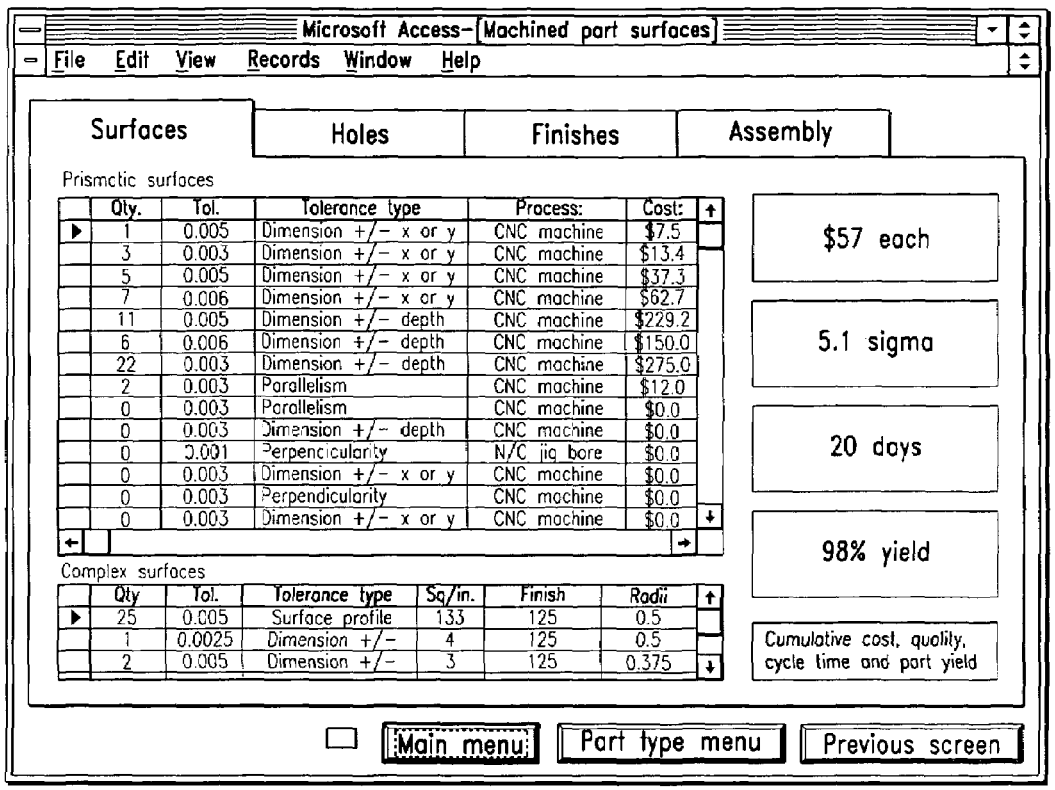
FIG. 17 illustrates a machine part surfaces screen.

FIG. 17 shows the Machined part surfaces screen which is shown after pressing the "Machined Part" access to all four primary features of a button on the "Part type menu" screen. This screen allows access to all four primary features of a machined part which includes surfaces, holes, finish processes, and assembly processes. This is step 127 in FIG. 14. Surfaces are separated by two types, prismatic and complex.

Under each of the primary features are the describing characteristics of each. The user describes the machined part by it's features and characteristics located on these screens. Both variable and attribute models are used simultaneously for prediction cost, quality, cycle time, and performance. This machined part surfaces screen requires the user to use drop down box choices on the Tolerance type and manually input the quantity, sq./in, and tolerance. Variable models are primarily used for these predictions and N/C machining centers or N/C jig bores are generally the processes chosen for machining the surfaces. All of the other fields are calculated based on the variables models which are embedded in the Toolset so that we can view the individual and cumulative cost, quality, and cycle time contributions of the design.

Figure 18:
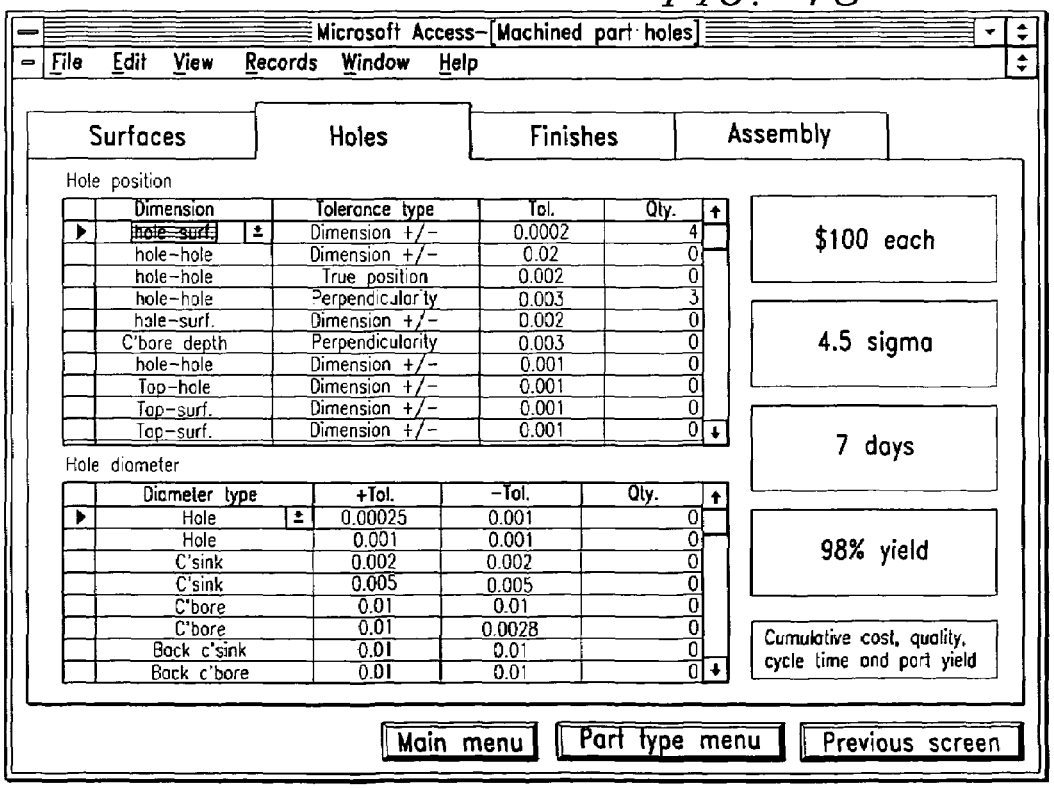
FIG. 18 illustrates a machined part holes screen.

FIG. 18 shows the Machined part holes screen which is shown after pressing the "Holes" tab from the Machined part surfaces screen. This screen allows access to all four primary features of a machined part which includes surfaces, holes, finish processes, and assembly processes. This is step 129 in FIG. 14. The user describes the machined part by it's features and characteristics located on these screens. This machined part hole screen requires the user to use drop down box choices on the tolerance type, dimension, and various other fields—with manual input the quantity, and tolerance. Variables models are primarily used in this model for predictions. All of the other fields calculated are based on variables models and generally choose the process of N/C centers or N/C jig bores for boring, milling, reaming or drilling the holes. Both individual and cumulative cost, quality, and cycle time are displayed on the screen or in the grid when features and characteristics are describing the design.

FIG. 19 shows the Alodine finish process screen which is the initial screen shown after pressing the "Finishes" tab from any of the primary feature screens. This model is primarily an attribute model. The user chooses various characteristics about the process located on the screen which effect the cost, quality, and cycle time of the alodine process. This process is determined by the design when called out in the notes or processes section. The cost, quality, and cycle time indicated in the right hand boxes are only for the alodine process.

The process of alodine starts with a base cost, base quality, and base cycle time. Then they each either increase or decrease by certain percentages based on characteristic factors attached to each of the characteristics describing the process. Some characteristics effect all three metrics, some do not.

Alodine is a chemical process (chromate conversion) used primarily for corrosion resistance on aluminum parts which result in very little build up and generally a faint yellowish tint.

FIG. 20 shows the Anodize finish process screen which is located under the "Finishes" tab from any of the primary feature screens. This model is primarily an attribute model. The user chooses various characteristics about the process located on the man which effect the cost, quality, and cycle time of the anodize process. This process is determined by the design when called out in the notes or processes section. The cost, quality, and cycle time indicated in the right hand boxes are only for the anodize process.

The process of anodize starts with a base cost, base quality, and base cycle time. Then they each either increase or decrease by certain percentages based on characteristic factors attached to each of the characteristics describing the process.

Anodize is a chemical process used, primarily for wear and corrosion resistance on aluminum parts which generally results in a slight material build up with various colors options.

FIG. 21 shows the Passivate finish process screen which is located under the "Finishes" tab from any of the primary feature screens. This model is primarily an attribute model. The user chooses various characteristics about the process located on the screen which effect the cost, quality, and cycle time of the anodize process. This process is determined by the design when called out in the notes or processes section. The cost, quality, and cycle time indicated in the right hand boxes are only for the Passivate process.

The process of passivation starts with a base cost, base quality, and base cycle time. Then they each either increase or decrease by certain percentages based on characteristic factors attached to each of the characteristics describing the process.

Passivation is a chemical process used primarily for corrosion resistance on stainless steel material type parts which generally results in a very slight material build up with a faint yellowish tint.

FIG. 22 shows the Plating finish process screen which is located under the "Finishes" tab from any of the primary feature screens. This model is primarily an attribute model. The user chooses various characteristics about the process located on the screen which effect the cost, quality, and cycle time of the plating process. This process is determined by the design when called out in the notes or processes section. The cost, quality, and cycle time indicated in the right hand boxes are only for the plating process.

The process of plating starts with a base cost, base quality, and base cycle time. Then they each either increase or decrease by certain percentages based on characteristic factors attached to each of the characteristics describing the process.

Plating is a chemical or electrochemical process used on various materials to effect the performance of the base material such as corrosion resistance, wear resistance, conductive resistance, aesthetics, and other possibilities.

FIG. 23 shows the Painting finish process screen which is located under the "Finishes" tab from any of the Primary feature screens. This model is primarily an attribute model. The user chooses various characteristics about the process located on the screen which effect the cost, quality, and cycle time of the painting process. This process is determined by the design when called out in the notes or processes section.

The process of painting starts with a base cost, base quality, and base cycle time. Then they each either increase or decrease by certain percentages based on characteristic factors attached to each of the characteristics describing the process.

Painting is a process used on various materials to effect aesthetics, corrosion resistance, wear resistance, etc. which usually results in various colors, textures, or finishes.

FIG. 24 shows the mask/demask process screen which is located under the "Finishes" tab from any of the primary feature screens. This model is primarily an attribute model. The user chooses various characteristics about the process located on the screen which effect the cost, quality, and cycle time of the painting process. This process is determined by the design when called out in the notes or processes section.

The process of mask/demask starts with a base cost, base quality, and base cycle time. Then they each either increase or decrease by certain percentages based on characteristic factors attached to each of the characteristics describing the process.

Mask/demask is a process used to keep paint and chemicals free from certain areas of the parts to effect aesthetics, corrosion resistance, wear resistance, etc.

FIG. 25 shows the marking finish process screen which is located under the "Finishes" tab from any of the primary feature screens. This model is primarily an attribute model. The user chooses various characteristics about the process located on the screen which effect the cost, quality, and cycle time of the painting process. This process is determined by the design when called out in the notes or processes section.

The process of marking starts with a base cost, base quality, and base cycle time. Then they each either increase or decrease by certain percentages based on characteristic factors attached to each of the characteristics describing the process.

Marking is a process used to identify parts or assemblies as well as functional use requirements such as switch indications, degree markings etc.

FIG. 26 shows the heat treat finish process screen which is located under the "Finishes" tab from any of the primary feature screens. This model is primarily an attribute model. The user chooses various characteristics about the process located on the screen which effect the cost, quality, and cycle time of the painting process. This process is determined by the design when called out in the notes or processes section.

The process of heat treating starts with a base cost, base quality, and base cycle time. Then they each either increase or decrease by certain percentages based on characteristic factors attached to each of the characteristics describing the process.

Heat treating is a process used to change the material characteristics of metal. These include hardening, softening, annealing and other desired physical characteristics of the Material after the process. Heat treating can occur prior to, during, or after all processes with different results depending upon the timing.

Figure 27:
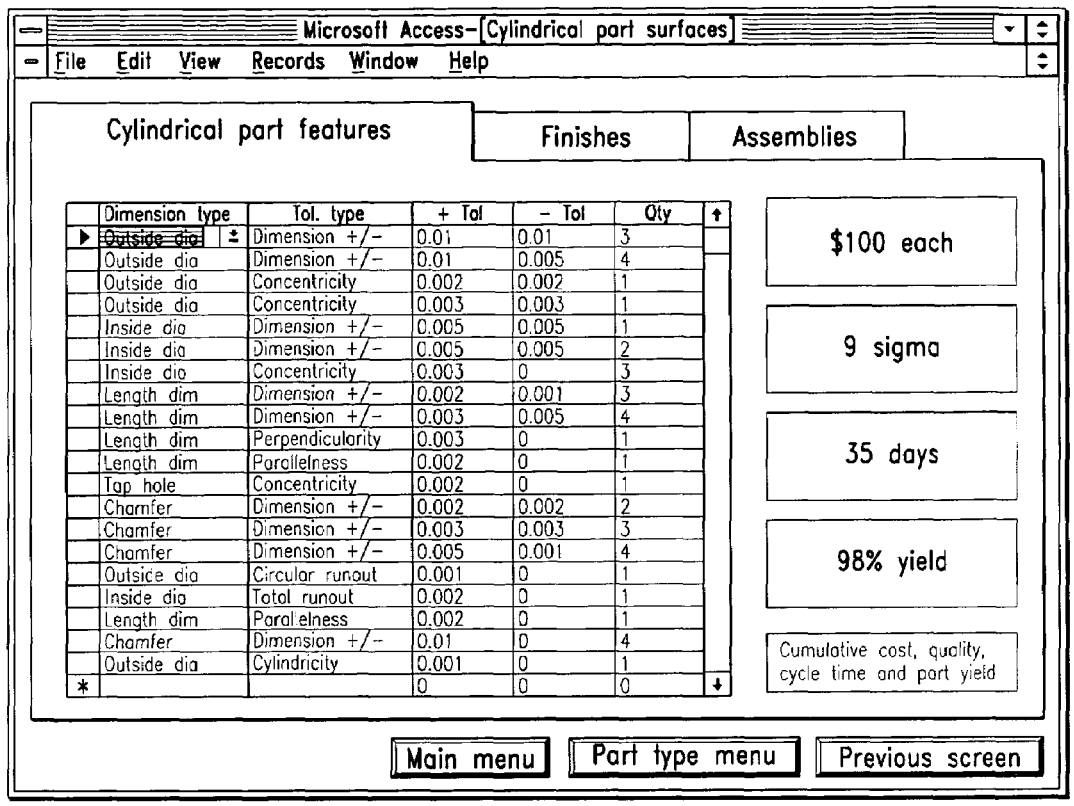
FIG. 27 illustrates a cylindrical part surface screen.

FIG. 27 shows the Cylindrical part surface screen which is shown after pressing the "Cylindrical Part surfaces" button located on the "Part type menu" screen. This screen allows access to all three primary features of a cylindrical part which includes cylindrical part features, finish processes, and assembly processes. In some instances a user may choose to describe the features and characteristics of a part using both the "Cylindrical part surfaces" screen and the machined part surfaces/holes screen. Part features that are described using the "Cylindrical part surfaces" screen will use the primary process of a CNC lathe for turning ID's, OD's, lengths, etc.

The "Cylindrical part surfaces" screen requires the user to use drop down box choices on characteristics such as dimension type, tolerance type, +tol., −tol., and quantity. All of the other fields are calculated using the embedded variables models so we can view the cost, quality, and cycle time contributors both individually and cumulatively.

Figure 28:
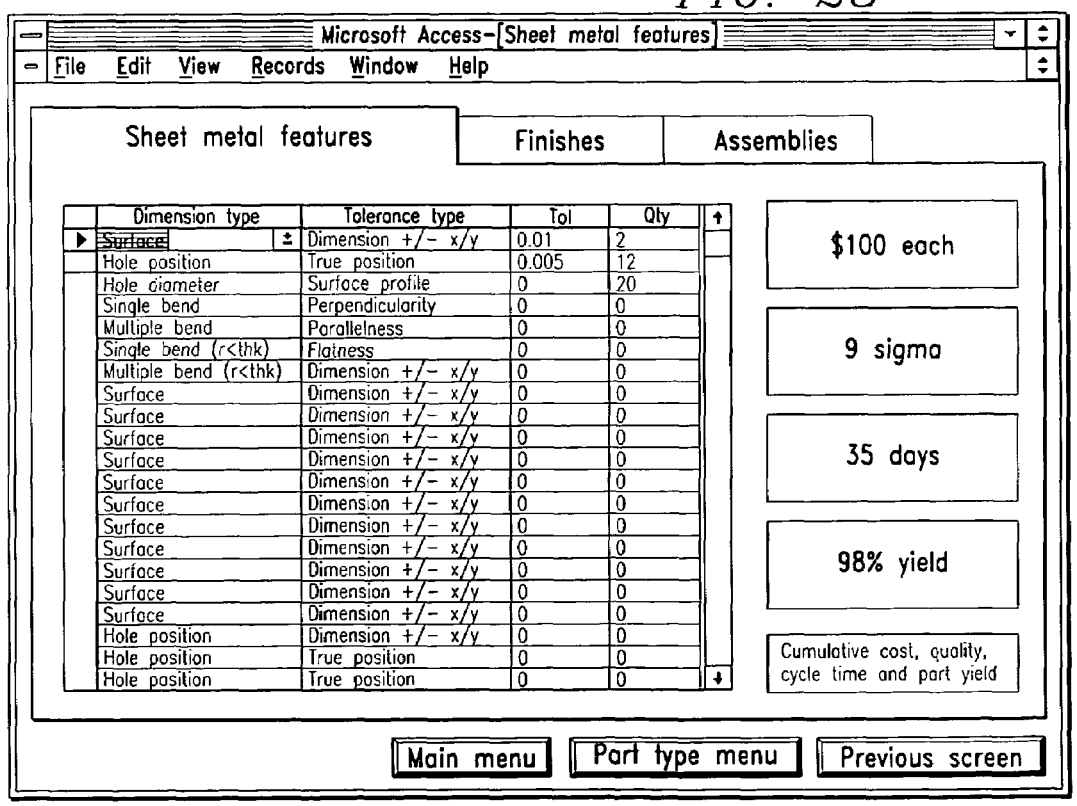
FIG. 28 illustrates a sheet metal feature screen.

FIG. 28 shows the "Sheet metal features" screen which is shown after pressing the "Sheet metal parts" button located on the "Part type menu" screen. This screen allows access to all three primary features of a sheet metal part which includes sheet metal features, finish processes, and assembly processes. In some instances a user may choose to describe the features and characteristics of a part using both the "Sheet metal features" screen and the "Machined part surfaces/holes" screen. Part features that are described using the "Sheet metal features" screen will use the primary process of a CNC punch press machine of break press.

The "Sheet metal features" screen requires the user to use drop down box choices on characteristics such as dimension type, tolerance type, tolerance and quantity. All of the other fields are calculated using the embedded variables models so we can view the cost, quality, and cycle time contributors both individually and cumulatively.

FIG. 29 shows the "Assemblies" screen after pressing the "Assemblies" tab once you have navigated down in the part type. This model is primarily an attribute model and only includes the assembly type Process which occur in the Metal Fabrication Technology area. Other assembly processes are located in the major technology area of which they occur.

The user chooses the features to be assembled and their quantity per assembly from this screen. The model includes the cost of the parts being assembled, the labor cost of assembling them, and any rework costs associated with the quality.

Figures 30, 31:
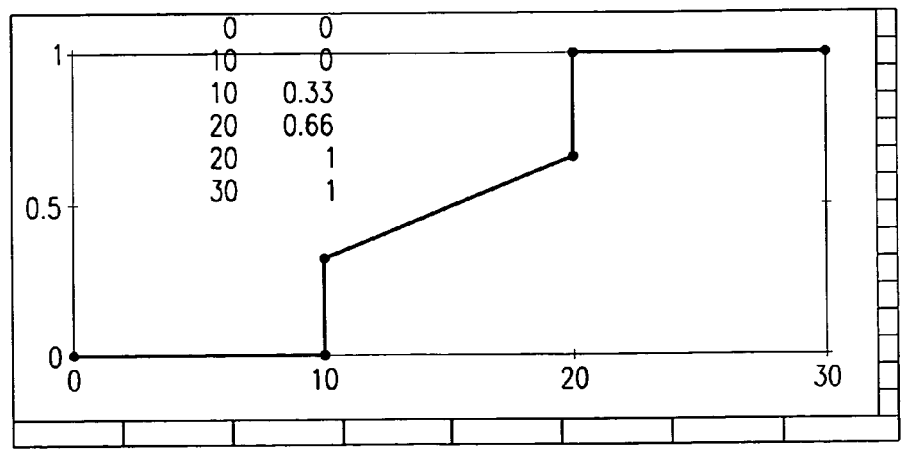
FIG. 30 illustrates a second manual input screen.
FIG. 31 is a graph of values for the rate (y-axis) versus input values x-axis).

FIG. 30 shows the "Manual cost, quality, cycle time input" screen after pressing the "Manual input" button located on the "Part type menu" screen. This screen is used for direct inputs of cost, quality, and cycle time and is not effected by any formula other than a straight roll up of the data.

The intent of this screen is to be a place where data can be input because no other screen includes this data, or you have actual data on the individual part and prefer it verses a predicted number. Also all possible processes can not be included in any one Toolset and this allows for that possibility with maximum flexibility.

The formulas used for the embodiment of FIGS. 14–30 are as follows:

| | |
|---|---|
| Learning curve factor | (((1/learning curve basis qty.]^ (Log([% learning curve])/Log(2)))))*([total quantity required])^ (Log([% learning curve])/Log(2)) |
| Size Factor | (((1/([maximum cu/in]^ (Log([size curve])/Log(2)))) * ([size basis])^ (Log([size curve])/Log(2))) |
| Machinability factor | (if[material type = 1, then machinability type 1; if = 2, then machinability type 2; if = 3, then machinability factor = machinability type 3, etc.) |
| Sigma to Dpmo conversion | (((((((1 + .049867346*sigma) + 0.0211410061*sigma 2) + 0.00322776263*sigma^3) + 0.0000380036*sigma ^ 4) + 0.0000488906 *sigma ^ 5) + 0.000005383*sigma^6) −− 16/2)* 1000000 |
| Dpo to sigma conversion | (Log(1/dpo^2)^0.5) − (2.515517 + 0.802853*(Log(1/dpo^2) ^0.5 + 0.010328*(Log(1/dpo^2)^0.5^2)/(1 + 1.432788*(Log |

-continued

| | |
|---|---|
| | $(1/dpo^2)^{0.5} + 0.189269*(Log(1/dpo^2)^{0.5})^{} + 0.001308 *(Log(1/dp0^2)^{0.5^3}) + 1.5$ |
| Dpu | Defects per opportunity (DPO)x opportunity count |
| Dpo | Defects per million opportunities/1,000,000 |
| Dpo | Dpu/opportunity |
| Sigma | Tolerance/standard deviation |
| First time yield (fty) | $e^{-dpu}$ |
| Total dpu | Total opportunities × total dpo |
| Variables data cost formula | [Qty[(base time + rework time + scrap time + setup avg time)($/hr*(overhead rate* 1 + % adders))) (Learning curve factor* machinability factor*size factor)]] + ((material cost + scrap material cost)(1 + material overhead %)) |
| Attribute data cost formula | [Qty[(base time + rework time + scrap time + setup avg time)($/hr*(overhead rate*(1 + % adders)))(attribute characteristics cost factors)]] + ((material cost + scrap material cost)* (1 + material overhead %)) |
| Process type formula | Process = technology type + part type + features + characteristics |
| Rework time formula | [(Qty * rework time base)(total % yield loss * % rework)] |

In the embodiment to follow, the database used is a SQL server with a Visual Basic Interface. The following nomenclature, abbreviations, and definitions are used.

| | |
|---|---|
| Build Run Time | Average labor time required to manufacture one unit of production |
| Build Setup Time | Average labor time required to prepare for the manufacture of one lot of product |
| Build Unattended Time | Manufacturing process time that does not include run time, i.e. other than operator attended processing time. |
| Default Characteristic Value | The initial value of a characteristic when a new worksheet evaluation is performed. Value must be equal to or within the upper and lower limits of the characteristic. Value must be greater than or equal to zero and less than ten thousand. This value is input on the CHARACTERISTIC window for "Rated User Input" and "User Input" features. |
| dpmo | Defects per million opportunities |
| dpmo Rate | Value from zero to one which is assigned to a rated feature characteristic. The value determines how much contribution the feature characteristic contributes to the overall quality score. The value is input on the CHARACTERISTICS window. |
| DPU | Defects per unit |
| Rework Run Time | Average labor time required to rework/repair one defect during manufacture of product. |
| Rework Setup Time | Average labor time required to prepare for the rework/repair process |
| Rework Unattended Time | Unattended run time associated with rework/repair activity |
| Standard Deviation | Statistical index of variability which describes the manufacturing capability of a process |
| Tolerance | The permissible deviation from a specified value of a design specification |
| Unattended hours/time | The build or rework manufacturing process time where no labor is being charged. Unattended hours is a component of cycle time. |
| Values for Rated User Input Feature | When adding a rated user input feature, you need to input values for upper limit, rated upper limit, upper limit rate, lower limit, rated lower limit, and lower limit rate. These values are defined using the graph on FIG. 31. The y-axis represents values for the rate and the x-axis for input values. From the input values 0 to 10, the rate is 0. At the input value of 10, the rate increases to 0.4. From input values 10 to 20, the rate increases to a value of 0.6 at the input value of 20, the rate increases to 1. All input values from 20 to 30 have a rate of 1. The lower limit in this example is 0. The upper limit in this example 30. The rated lower limit is 10, and the rated upper limit is 20. The lower limit rate is 0.4 and the upper limit rate is 0.6. |
| Weight | A value assigned to a rated feature ranging from greater than 0 to 1. Sum of all weights is 1. |
| Zvalue | Standard Normal Deviate; a statistical value based on the process standard deviation used to calculate DPO. |

To build a model, there are 7 main tasks to be completed: add technology, add labor and overhead rates, add model, add features and feature characteristics, add restrictions, add dependencies, and add formulas.

A technology is a manufacturing process category containing one or more process capability models (PCM). Examples of technologies are Circuit Card Assembly, PWB Fab, Metal Fab, Interconnect, Electrical Assembly, and Mechanical Assembly. A model, or process capability model (PCM), is a mechanism for predicting quality, cycle time, and cost metrics for one or more manufacturing processes. The model is defined with features, feature characteristics, restriction, dependencies, and formulas. A feature is a descriptor of a part design or component of a part design that further defines a Process Capability Model. Also a description of a manufacturing process. Feature characteristics further define the feature. Each feature characteristic has associated with it a unit of measure and value.

There are six different types of features. These features are distinguished by the actions and calculations required on a worksheet:

1. Rated Feature—A weight is associated with each feature. Each characteristic of this feature has a rate. On the worksheet, only one characteristic can be selected for this feature. You may use this type of feature if you want the system to use the "dpmo range and feature scores" method for quality calculations.
2. Non-rated Feature—This feature can be used in assigning dependent values. Your would not use this feature if you want to use the "dpmo range and feature scores"

method of calculating quality. No values are required to be input at the time of adding the feature and a characteristic to the feature.

3. Rated User Input Feature—This feature has a weight associated with it. You can only add one characteristic to this feature. The characteristic to this feature has limits and a characteristic default value associated with it. On the worksheet, the characteristic default value displays as the input value, or the user can input a different value. You may use this type of feature if you want the system to use the "dpmo range and feature scores" method for quality calculations.

4. User Input Feature—This feature can have a characteristic with limits and a default value. On the worksheet, the default value displays as the input value, or the user can input a different value. The system allows only one characteristic to be assigned to a user input feature. This feature is not rated.

5. Multiple Selection Feature—This feature allows more than one characteristic selection on the worksheet. For this feature, the characteristics are defined as either being "on" or "off". A characteristic that is "on" is automatically selected on the worksheet. This feature is useful; when determining the answers to questions that help to define a value for a user-defined calculation.

6. Process Feature—This feature is used to help determine the process to be used as related to the model. The characteristic of the feature would be suggested processes. On the worksheet, characteristics for process features are not shown. After a model is evaluated, the select characteristics for the process feature is displayed. This is the recommended process.

The Table 4 below shows the required input values for each feature and its characteristics:

TABLE 4

| Type | Values Required |
|---|---|
| Rated Feature | Weight, dpmo rate. |
| Non-Rated Feature | No Values required. |
| Rated User Input Feature | Weight, upper limit, rated upper limit, upper limit rate, lower limit, rated lower limit, lower limit rate, default characteristic value. |
| User Input Feature | Upper limit, lower limit, default characteristic value. |
| Multiple Selection Feature | Default characteristic value. |
| Process Feature | No values required. |

DPU is calculated by one of three methods: the defects per million opportunities (dpmo) range and feature scores method, the mean dpmo and feature factors method, and the standard deviation and Zvalue method.

The dpmo range and feature scores method starts with a dpmo range, calculates a predicted dpmo by applying a total score factor which is based on individual design feature scores, which are based on feature weights and feature characteristic rates. The predicted dpmo is then converted to a predicted DPU.

In order to use this method, you need to:
Add at least one rated or rated user input feature
Input values for dpmo upper and lower limits on the MODEL SETUP window
Create a user-defined formula for Total Opportunities The mean dpmo and feature factors methods starts with a mean dpmo, converts it to a mean DPU, and then calculates a predicted DPU by applying a total DPU factor which is based on individual design feature DPU factors. The predicted DPU is then converted to a predicted dpmo.

In order to use this method, you need to:
Input a value for dpmo on the MODEL SETUP window
Add feature and/or model dependencies for DPU Factor
Create user-defined formulas for Total Opportunities and Total DPU Factor The standard deviation and Zvalue method starts with a process standard deviation and design tolerances and calculates a Zvalue, then determines a Defects Per Opportunity (DPO) based on the Zvalue. The DPO is then converted to a predicted DPU.

In order to use this method, you need to:
Leave values for dpmo mean, dpmo upper limit, and dpmo lower limit blank on the MODEL SETUP window.
Add model dependencies for Standard Deviation.

Create user-defined formulas for Total Opportunities and Tolerance.

See Table 5 for formulas to calculate DPU.

The system-defined formulas for cost and cycle time are present in Table 6. In order to have cost and cycle time calculated correctly, you need to:
Add labor rates and overhead
Create user-defined formulas for:
Build Run Time
Build Setup Time
Build Unattended Time
Rework Run Time
Rework Setup Time
Rework Unattended Time A restriction is a condition that is set among two features, called primary and secondary features. The condition is added with a comment or message. This message displays during a model evaluation session when the user selects the combination of feature characteristics that are "restricted".

The purpose of the restriction is to discourage the user from selecting restricted combinations of feature characteristics. An informational message is displayed to the user after the restricted combination has been selected. The user is able to proceed with the selection, but it is not recommended.

The number of restrictions is limited by the number of combinations of two feature characteristics. The combinations of feature characteristics have to be for different features within the same model.

A dependency is a value assigned to one or more of the following variables that will be based on feature characteristic selections made by the end user during a model evaluation.
Build Run Hours
Build Setup Hours
Build Unattended Hours
DPU Factor
Opportunity Factor
Rework Run Hours
Rework Setup Hours
Rework Unattended Hours
Standard Deviation The model builder defines the dependent values based on one feature/feature characteristic combination or multiple feature/feature characteristics combinations for a model.

Dependencies can be defined at the model and/or feature level. Feature level dependencies define values for a feature, and are dependent upon other feature/characteristic values.

Model level dependencies define values for a model, and are dependent on the relationship between feature/characteristics.

The value for Standard Deviation can only be defined at the model level.

Within the system there are user-defined formulas and system-coded formulas. The system-coded formulas are functions of the user-defined formulas. The user defined formulas can be created using a CREATE FORMULAS window generated and associated program.

User defined formulas are formulas that are defined by the user. For DPU metrics, the user must define the formulas for Tolerance, Total Opportunities, and Total DPU Factor, depending on the method for calculating quality metrics. Total Opportunities must be defined for all methods. For Cycle Time and Cost metrics, the user must define the formulas for Build Run Time, Build Setup Time, Build Unattended Time, Rework Run Time, Rework Setup Time, Rework Unattended Time.

To add a technology field name and comment field are generated and filed out. They are:

| Field Name | Comment |
| --- | --- |
| Learning curve percent | This value is used in cost and cycle time calculations. |
| Learning curve basis | This is used in cost and cycle time calculations. |
| Process Owner | Input the manager responsible for the technology. |

Optionally, the fields:

| Field name | Comment |
| --- | --- |
| Cycle Time Adjustment | This is used in cost and cycle time calculations. If this value is left blank, the value defaults to 1. |
| Comments | These comments only display on-line. Input any comment that should be viewed regarding the technology. |

To add labor and overhead rates, in put the following fields:

| Field Name | Comment |
| --- | --- |
| Year | You can input values by calendar year for ten years. The system sorts the years in chronological order. The year should be in the format YYYY, e.g. 1996). |
| Labor Rate | |
| Overhead Percent | |

To add a model the following fields are step up and filed out.

| Field Name | Comment |
| --- | --- |
| Revision | Defaults to blank. This field accepts alphanumeric characters. |
| DPMO Upper Limit | These values are used in the DPU calculation using the dpmo range and |

-continued

| Field Name | Comment |
| --- | --- |
| DPMO Lower Limit | features scores method. |
| DPMO Mean | This value is used in the DPU calculation using the mean dpmo and feature factors method. |
| Scrap Rate | Defaults to 0. Used in the dpmo range and feature scores method. |
| Opportunity Count | Defaults to 1. Can be used to calculate total opportunities. |
| Number of Times Model is Applied | Defaults to 1. Used in DPU, cost, and cycle time calculations. This value displays on the PCM EVALUATIONS windows. |
| Comments | |

The model is added to the listing of technologies.

To add a feature to a model the system generates a feature field by a "Features" window and user inputs the name of the feature. The feature is classed as a type. For a rated type input name in "Characteristic" field and input value in dpmo Rate field. The value must be greater than or equal to zero and less than or equal to one. For a Rated user Input type input name in "Characteristic" field and input values for Upper Limit, Rated Upper Limit, Upper Limit Rate, Lower Limit, Rated Lower Limit, Lower Limit Rate, and Default Characteristic Value. For a Process feature type input name in "Characteristics" field. For a non-rated feature input name in "Characteristics" field. For a User-input feature, input name in "Characteristics" field and input values for Upper Limit, Lower Limit, and Default. For a Multi-Select feature, input name in "Characteristics" field and select a default.

To add formulas a CREATE FORMULAS program with associated windows is created to add equations or change equations in the transition blocks.

The following terms are used in building worksheets.

| | |
| --- | --- |
| Constant Year $ | Baseline year for cost of money calculations |
| Prior Units Built | Quantity of units prior to manufacture of contract build quantity for which learning experience can be claimed (if no significant breaks in production have occurred). |
| Lot Size | Number of units released for manufacture at one time. |
| Contract Build Quantity | Number of deliverable units specified in the contract. |
| Program | Manufacturing/design effort or individual project. |
| Learning Curve % | The rate of predicted improvement in cost due or cycle time due to manufacturing experience based on repetitiveness. |
| Learning Curve Basis | A point on the learning curve, represented by a unit value, from which all labor hour based estimates are derived. |
| Labor Rate | negotiated/approved hourly pay for fabrication or assembly labor. |
| Overhead % | Negotiated/approved overhead cost, represented as a percent of labor cost. |

The Worksheet Setup screen is where the user begins to build a worksheet. The first step in building a worksheet is worksheet setup of definition. This can be done by scratch or by modifying a copy of an existing worksheet. Starting from scratch involves naming the worksheet and then defining some program level information that will be used in metric calculations and then determining from which technology the worksheet will be based (i.e. from which technology the models for the worksheet will be selected when assembling the worksheet). Modifying a copy of an existing worksheet involves using the worksheet copy function to copy an existing worksheet to a newly defined worksheet having a different program and worksheet name, and then modifying it. Modifications may include a change in Technology and/or program level information.

Once the worksheet is defined, it can be assembled or built using a setup screen. Building a worksheet involves selecting the unevaluated PCMs or models from a list of models previously created under the technology selected during worksheet setup. Once the models have been selected, they can be rearranged in an order in which they will appear in the body of the worksheet. The unevaluated worksheet has been built and is ready for evaluation. At this point, the user can evaluate the worksheet or save the unevaluated worksheet as a worksheet template that can be used as a starting point for future worksheets that need to be built using the same technology.

To build a worksheet, a worksheet program and worksheet screen is generated and is brought up from a menu bar. The worksheet program screen takes you to the Worksheet Set Up screen and program that has been generated. The setup screen has a Program field for entering the name of a program. In the Worksheet field, add the name of the worksheet. Input the following fields:

| Field Name | Comment |
| --- | --- |
| Part Desc | Name of part. |
| Analysis By | Your Name. |
| Analysis Date | Today's date. |
| Constant Year $ | Baseline year for $ value. |
| Prior Units Built | No. of units built to date. |
| Lot Size | No. of units in a lot. |

| Field Name | Comment |
| --- | --- |
| Contract Build Qty. | No. of deliverable units specified in the contract. |
| Technology | The manufacturing technology category. |
| Material Type | The material type: Aluminum, steel, etc. |
| Material Size | Length, width, and height or length and diameter. |
| Program | The name of the program being evaluated. |
| Worksheet | The part number of the part or assembly being evaluated. |

Each model can be evaluated. The user will make feature characteristic selections and/or inputs for each feature displayed, and then also calculate process. At this time, the quality, cost and cycle time metrics will be calculated, using a combination of user defined and system coded formulas. The model and worksheet summary metrics will be displayed on both of the model evaluation screens or printed on a printer. The format of the model and worksheet summary metrics will be determined by the user and can be defined prior to or after metric calculation.

Once the model evaluation is complete, the user will go back to the worksheet screen where the model metric data will have been transferred to the worksheet as a line item, located under the unevaluated model description. If more than one model evaluation session has been completed prior to returning to the worksheet, each completed model evaluation will be represented as a line item on the worksheet, again located under the unevaluated model description in the order in which the evaluation sessions were completed.

TABLE 5

Dpmo Range and Feature Scores Method $dpmo_{pred}$ = [(1 − ΣScores)(DPMO Upper Limit − DPMO Lower Limit) + DPMO Lower Limit]
Scores = Rate * Weight
$DPU_{pred}$ = (Total Opportunities * $DPMO_{pred}$)/1,000,000
$DPU_{scrap}$ = $DPU_{pred}$ * Scrap rate
$DPU_{rework}$ = $DPU_{pred}$ − $DPU_{scrap}$
$Yield_{pred}$ = $e^{-DPUpred}$ * 100
$Sigma_{pred}$ = [(SQRT(LN(1/($dpmo_{pred}$/1000000)^2))) − (2.515517 + 0.802853 * (SQRT(LN(1/($dpmo_{pred}$/1000000)^2))) + 0.010328 * (SQRT(LN(1/($dpmo_{pred}$/1000000)^2)))^2)/(1 + 1.432788 * (SQRT(LN(1/($dpmo_{pred}$/1000000)^2))) + 0.189269 * (SQRT(LN(1/($dpmo_{pred}$/1000000)^2)))^2 + 0.001308 * (SQRT(LN(1/($dpmo_{pred}$/1000000)^2)))^3)] + 1.5

Mean Dpmo and Feature Factors Method $DPU_{avg}$ = (Total Opportunities * DPMO Mean)/1,000,000
$K_{dpu}$ = Product and/or sum of Non-Rated Feature Characteristic DPMO Factors ($K_{factor}$)
= $K_{factor1}$ * $K_{factor2}$ + $K_{factor3}$ ... $K_{factorn}$
$DPU_{pred}$ = $K_{dpm}$ * $DPU_{avg}$
$dpmo_{pred}$ = $DPU_{pred}$ * 1,000,000/Total Opportunities
$Yield_{pred}$ = $e^{-DPUPred}$ * 100
$Sigma_{pred}$ = [(SQRT(LN(1/($dpmo_{pred}$/1000000)^2))) − (2.515517 + 0.802853 * (SQRT(LN(1/($dpmo_{pred}$/1000000)^2))) + 0.010328 * (SQRT(LN(1/($dpmo_{pred}$/1000000)^2)))^2)/(1 + 1.432788 * (SQRT(LN(1/($dpmo_{pred}$/1000000)^2))) + 0.189269 * (SQRT(LN(1/($dpmo_{pred}$/1000000)^2)))^2 + 0.001308 * (SQRT(LN(1/($dpmo_{pred}$/1000000)^2)))^3)] + 1.5

Standard Deviation & Zvalue Method

Zvalue = Tolerance/Standard Deviation
DPO = [((((((1 + .049867346 * (Zvalue − 1.5)) + .0211410061 * (Zvalue − 1.5)$^2$) +

TABLE 5-continued

|  |  |
|---|---|
| | $.0032776263 * (Zvalue - 1.5)^3) + .0000380036 * (Zvalue - 1.5)^4) + .0000488906 * (Zvalue - 1.5)^5) + .000005383 * (Zvalue - 1.5)^6)^{-16})/2]$ |
| $DPU_{prd} =$ | DPO * Total Opportunities |
| $dpmo_{pred} =$ | $DPU_{pred}$ * 1,000,000/Total Opportunities |
| $Yield_{pred} =$ | $e^{-DPUpred}$ * 100 |
| $Sigma_{pred} =$ | $[(SQRT(LN(1/(dpmo_{pred}/1000000)\hat{\ }2))) - (2.515517 + 0.802853 * (SQRT(LN(1/(dpmo_{pred}/1000000)\hat{\ }2))) + 0.010328 * (SQRT(LN(1/(dpmo_{pred}/1000000)\hat{\ }2)))\hat{\ }2)/(1 + 1.432788 * (SQRT(LN(1/(dpmo_{pred}/1000000)\hat{\ }2))) + 0.189269 * (SQRT(LN(1/(dpmo_{pred}/1000000)\hat{\ }2)))\hat{\ }2 + 0.001308 * (SQRT(LN(1/(dpmo_{pred}/1000000)\hat{\ }2)))\hat{\ }3)] + 1.5$ |

TABLE 6

Cycle Time Formulas

|  |  |
|---|---|
| $Yield\ loss_{scrap} =$ | $1 - e^{-DPUscrap}$ |
| $Yield\ loss_{rework} =$ | $1 - e^{-DPUrework}$ |
| $HPU_{set-up} =$ | Build Setup Time ÷ Lot Size |
| $HPU_{theoretical} =$ | ($HPU_{set-up}$ + (Build Run Time * Number of Times Model is Applied)) |
| $HPU_{scrap} =$ | $HPU_{theoretical}$ * $Yield\ loss_{scrap}$ |
| $HPU_{rework} =$ | ((Rework Setup Time * $Yield\ loss_{rework}$) ÷ Lot Size) + (Rework Run Time * $DPU_{rework}$) |
| $HPU_{total} =$ | $HPU_{theoretical}$ + $HPU_{scrap}$ + $HPU_{rework}$ |
| Total Learned Units = | Prior Units Built + Contract Build Quantity |
| $Unit_{TLMP} =$ | $((((Total\ Learned\ Units + 0.5)\hat{\ }(1 + (LN(Learning\ Curve)/LN(2)))) - (0.5\hat{\ }(1 + (LN(Learning\ Curve)/LN(2)))))/((1 + (LN(Learning\ Curve)/LN(2)))*(Total\ Learned\ Units)))\hat{\ }(1/(LN(Learning\ Curve)/LN(2)))$ |
| $HPU_{TLMP} =$ | $HPU_{total}$ * ($Unit_{TLMP}$/Unit Basis)*((LOG(Learning Curve))/LOG(2)) |
| $HPU_{NVA} =$ | $HPU_{set-up}$ + $HPU_{scrap}$ + $HPU_{rework}$ |
| $HPU_{\%NVA} =$ | ($HPU_{NVA}$/$HPU_{total}$) * 100 |
| Unattended Run $Time_{scrap} =$ | Build Unattended Time * $Yield\ loss_{scrap}$ |
| Unattended Run $Time_{rework} =$ | Rework Unattended Time * $Yield\ loss_{rework}$ |
| Cycle Time Per $Lot_{theoretical} =$ | ($HPU_{theoretical}$ * Lot Size) + Build Unattended Time |
| Cycle Time Per $Lot_{scrap} =$ | (($HPU_{scrap}$ * Lot Size) + Unattended Run $Time_{scrap}$) * Cycle Time Adjustment |
| Cycle Time Per $Lot_{rework} =$ | (($HPU_{rework}$ * Lot Size) + Unattended Run $Time_{rework}$) * Cycle Time Adjustment |
| Cycle Time Per $Lot_{total} =$ | (Cycle Time Per $Lot_{theoretical}$ * Cycle Time Adjustment) + Cycle Time Per $Lot_{scrap}$ + Cycle Time Per $Lot_{rework}$ |
| Cycle Time Per $Lot_{TLMP} =$ | [($HPU_{TLMP}$ * Lot Size) + Unattended Run $Time_{scrap}$ + Unattended Run $Time_{rework}$ + Build Unattended Time] * Cycle Time Adjustment |
| Cycle Time Per $Lot_{NVA} =$ | (($HPU_{NVA}$ * Lot Size) + Unattended Run $Time_{scrap}$ + Unattended Run $Time_{rework}$) * Cycle Time Adjustment |
| Cycle Time Per $Lot_{\%NVA} =$ | (Cycle Time Per $Lot_{NVA}$/Cycle Time Per $Lot_{total}$) * 100 |

Cost Formulas

|  |  |
|---|---|
| $Cost_{scrap} =$ | $HPU_{scrap}$ * (Labor Rate * (1 + Labor Overhead)) |
| $Cost_{rework} =$ | $HPU_{rework}$ * (Labor Rate * (1 + Labor Overhead)) |
| $Cost_{theoretical} =$ | $HPU_{theoretical}$ * (Labor Rate * (1 + Labor Overhead)) |
| $Cost_{total} =$ | $Cost_{rework}$ + $Cost_{scrap}$ + $Cost_{theoretical}$ |
| | or |
| $Cost_{total} =$ | $HPU_{total}$ * (Labor Rate * (1 + Labor Overhead)) |
| $Cost_{TLMP} =$ | $HPU_{TLMP}$ * (Labor Rate * (1 + Labor Overhead)) |
| $Cost_{NVA} =$ | $Cost_{rework}$ + $Cost_{scrap}$ |
| $Cost_{\%NvA} =$ | (($Cost_{rework}$ + $Cost_{scrap}$)/$Cost_{total}$) *100 |

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A manufacturing process capability predictor that will display process predictions for a manufacturing process as a function of product design specifications comprising:

a data base of manufacturing process capability data of multiple manufacturing process design characteristics significant to manufacturing process outcome and outcome ratings and expert designed manufacturing process prediction models;

first interactive input means coupled to said database for inputting manufacturing process feature weights and feature characteristic ratings by a manufacturing process owner;

a second interactive input means input means for selecting manufacturing process design characteristics by a user;

a processor responsive to selected manufacturing process design characteristics and coupled to said database of manufacturing process capability data including said prediction models for generating signals representing manufacturing process capability predictions for the selected process design characteristics according to predetermined algorithm, said feature weights and feature characteristic ratings; and a display responsive to said signals for displaying said predictions.

2. The capability predictor of claim 1 wherein said process characteristics includes a performance model.

3. The capability predictor of claim 2 wherein said process characteristics includes a quality model.

4. The capability predictor of claim 3 wherein said quality model is an attributes model.

5. The capability predictor of claim 3 wherein said quality model is a variable data model.

6. The capability predictor of claim 3 wherein said process characteristics include a cost model.

7. The capability predictor of claim 6 wherein said process characteristics include a cycle time model.

8. The capability predictor of claim 3 wherein said quality model is a function of historical manufacturing data.

9. The capability predictor of claim 3 wherein said quality model is a function of expert knowledge.

10. The capability predictor of claim 3 wherein said quality model is a function of feature characteristics, historical manufacturing data and expert knowledge.

11. The capability predictor of claim 1 wherein said process characteristics include a cycle time model.

12. The capability predictor of claim 11 wherein said cycle time model is a function of quality.

13. The capability predictor of claim 12 wherein said cycle time is also a function of feature characteristics, historical manufacturing data and expert knowledge.

14. The capability predictor of claim 1 wherein said process characteristics include a cost model.

15. The capability predictor of claim 14 wherein said cost model is a function of quality and cycle time.

16. The capability predictor of claim 15 wherein said cost model is also a function of feature characteristics, historical manufacturing data, and expert knowledge.

17. A manufacturing process capability predictor that will predict quality, cycle time and cost for a manufacturing process as a function of product design specifications, comprising:

a database of manufacturing process design characteristics significant to manufacturing outcome and outcome ratings and expert designed manufacturing process quality, cycle time and cost prediction models;

first interactive input means coupled to said database for inputting manufacturing process data including said manufacturing process quality, cycle time and cost prediction models and feature weights, feature characteristic ratings and confidence levels by a manufacturing process owner;

second interactive input means input means for selecting manufacturing process design characteristics by a user;

a processor responsive to selected manufacturing process design characteristics and coupled to said database including said manufacturing process prediction models for generating signals representing manufacturing process capability predictions for the selected manufacturing process design characteristics according to said manufacturing process quality, cycle time and cost models and said feature weights, feature characteristic ratings, and confidence levels; and a display responsive to said signals for displaying said manufacturing process capability predictions.

18. A method for providing manufacturing process capability prediction as a function of product design specification comprising the steps of:

providing data for manufacturing process design characteristics significant to manufacturing process outcome and outcome ratings and expert manufacturing process design models;

inputting proposed manufacturing process design characteristics; and processing said data and inputs in a computer containing manufacturing process capability algorithms and generating signals representing manufacturing process capability predictions for the proposed design according to said manufacturing process capability algorithms.

19. A method of providing manufacturing process predictions of quality, cycle time and cost for a manufacturing process as a function of product design specifications comprising the steps of:

providing data of manufacturing process design characteristics significant to manufacturing process outcome and outcome ratings and expert designed manufacturing process quality, cycle time, and cost prediction models;

inputting proposed manufacturing process design characteristics; and processing said data and inputted proposed manufacturing process design characteristics in a computer and generating signals for the selected design representing manufacturing process capability predictions for quality, cycle time and cost according to said manufacturing process algorithms for quality, cycle time and cost.

20. A manufacturing process capability predictor that will display process predictions for a manufacturing process as a function of product design specifications comprising:

a database of manufacturing process capability data of multiple manufacturing process design characteristics significant to manufacturing process outcome and outcome ratings and expert designed prediction models;

an interactive input means for selecting manufacturing process design characteristics by a user; and a processor responsive to said selective manufacturing process design characteristics and coupled to said database of process capability data including said manufacturing process prediction models for generating signals representing manufacturing process capability predictions for the selected design according to predetermined algorithm.

21. A manufacturing process capability predictor that will predict quality, cycle time and cost for a manufacturing process as a function of product design specifications, comprising:

a database of manufacturing design characteristics significant to manufacturing outcome and outcome ratings and expert designed manufacturing process quality, cycle time and cost prediction models;

first interactive input means coupled to said database for inputting manufacturing process data including said manufacturing process quality, cycle time and cost prediction models and feature weights, feature characteristics ratings and confidence levels by a manufacturing process owner;

second interactive input means for selecting manufacturing process design characteristics by a user; and a processor responsive to said selected design characteristics and coupled to said database of manufacturing process design characteristics including said manufacturing process prediction models for generating manufacturing process signals representing manufacturing process capability predictions for the selected manufacturing process design according to said manufacturing process quality, cycle time and cost models and said feature weights, feature characteristic ratings and confidence level.

22. A manufacturing process capability predictor that will predict quality, cycle time and cost for a manufacturing process as a function of product design specifications, comprising:

a database if manufacturing process design characteristics significant to manufacturing outcome and outcome ratings and expert designed manufacturing process quality, cycle time and cost prediction models;

an interactive input means for selecting manufacturing process design characteristics by a user; and a processor responsive to said selected manufacturing process design characteristics and coupled to said database including manufacturing process prediction models for generating manufacturing process signals representing manufacturing process capability predictions for the selected manufacturing process design according to said manufacturing process quality, cycle time and cost models.

23. The capability predictor of claim 22 wherein said models are variable data models.

24. The capability predictor of claim 22 wherein said models are attribute models.

* * * * *